(12) United States Patent
Miller

(10) Patent No.: US 7,827,028 B2
(45) Date of Patent: Nov. 2, 2010

(54) METHOD AND SYSTEM OF MACHINE TRANSLATION

(75) Inventor: Scott Miller, Waban, MA (US)

(73) Assignee: Basis Technology Corporation, Cambridge, MA (US)

( * ) Notice: Subject to any disclaimer, the term of this patent is extended or adjusted under 35 U.S.C. 154(b) by 873 days.

(21) Appl. No.: 11/784,449

(22) Filed: Apr. 6, 2007

(65) Prior Publication Data
US 2007/0239423 A1      Oct. 11, 2007

Related U.S. Application Data

(60) Provisional application No. 60/790,076, filed on Apr. 7, 2006.

(51) Int. Cl.
G06F 17/28       (2006.01)
G06F 17/27       (2006.01)
(52) U.S. Cl. .................. 704/2; 704/4; 704/277
(58) Field of Classification Search ............ 704/1, 704/2, 4, 5, 7, 9, 277
See application file for complete search history.

(56) References Cited

U.S. PATENT DOCUMENTS

| | | | |
|---|---|---|---|
| 5,477,451 A | | 12/1995 | Brown et al. |
| 5,930,746 A * | | 7/1999 | Ting .................. 704/9 |
| 6,233,544 B1 | | 5/2001 | Alshawi |
| 6,609,087 B1 | | 8/2003 | Miller et al. |
| 7,403,890 B2 * | | 7/2008 | Roushar .................. 704/9 |
| 7,437,284 B1 * | | 10/2008 | Margulies .................. 704/7 |
| 7,562,009 B1 * | | 7/2009 | Emerson et al. .................. 704/9 |
| 7,596,485 B2 * | | 9/2009 | Campbell et al. .................. 704/9 |
| 7,624,005 B2 * | | 11/2009 | Koehn et al. .................. 704/2 |
| 7,698,125 B2 * | | 4/2010 | Graehl et al. .................. 704/5 |
| 2002/0046018 A1 | | 4/2002 | Marcu et al. |
| 2003/0023423 A1 | | 1/2003 | Yamada et al. |
| 2003/0216905 A1 * | | 11/2003 | Chelba et al. .................. 704/9 |
| 2005/0234701 A1 | | 10/2005 | Graehl et al. |
| 2006/0004563 A1 | | 1/2006 | Campbell et al. |
| 2006/0253274 A1 * | | 11/2006 | Miller .................. 704/9 |

OTHER PUBLICATIONS

Zhang et al., "Knowledge Source Construction in Data-Oriented English-Chinese Machine Translation", Proceedings of the 2005 IEEE International Conference on Natural Language Processing and Knowledge Engineering, 2005, IEEE NLP-KE '05, pp. 404 to 409.*

(Continued)

Primary Examiner—Martin Lerner
(74) Attorney, Agent, or Firm—Sampson & Associates, P.C.

(57) ABSTRACT

A system and method is provided for generating a translingual parsing model and for using the model to machine translate a source language to a destination language. The system and method includes receiving a sentence in the source language, and with the translingual parsing model, searching among and statistically ranking candidate parses each having elements labeled with destination language words, syntactic labels, and role labels indicating relationships between the elements. A statistically high ranked parse is selected and rearranged using the syntactic and role labels, in accordance with word order conventions of the destination language to generate a translingual parse of the source language sentence.

40 Claims, 24 Drawing Sheets

OTHER PUBLICATIONS

Winfield S. Bennett, Jonathan Slocum; "The LRC Machine Translation System", Computational Linguistics, vol. 11, Nos. 2-3, Apr.-Sep. 1985; 11 pages.

Eugene Charniak, Mark Johnson; "Coarse-to-fine n-best parsing and MaxEnt discriminative reranking"; Proceeding of the 43rd Annual Meeting of the Association for Computational Linguistics; 2005; pp. 173-180.

Michael Collins; "Three-Generative, Lexicalised Models for Statistical Parsing"; Proceedings of the 43rd Annual Meeting of the ACL; 1997; 8 pages.

I. Dan Melamed; "Statistical Machine Translation by Parsing"; Proceedings of the 42nd Annual Meeting of the Association for Computational Linguistics; 2004; 8 pages.

Mitchell P. Marcus; Mary Ann Marcinkiewicz; "Building a Large Annotated Corpus of English: The Penn Treebank"; Computational Linguistics, vol. 19, No. 2; 1994; 18 pages.

Dekai Wu; "Stochastic Inversion Transduction Grammars and Bilingual Parsing of Parallel Corpora"; Computational Linguistics, 1997; 23 (3):pp. 377-403.

Kenji Yamada and Kevin Knight; "A Decoder for Syntax-based Statistical MT"; Proceedings of the 40th Annual Meeting of the Association for Computational Linguistics; 2002; 8 pages.

* cited by examiner

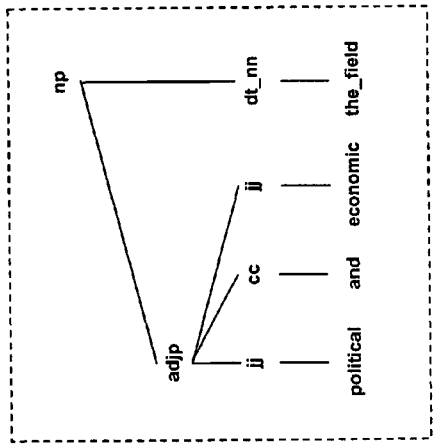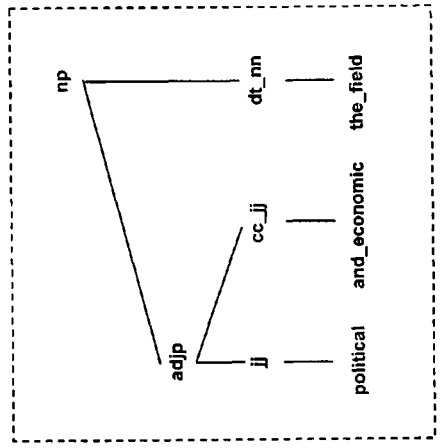
Figure 6
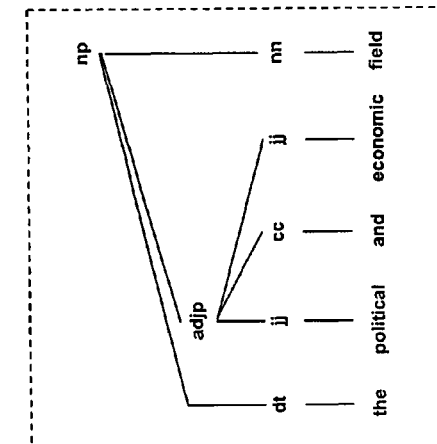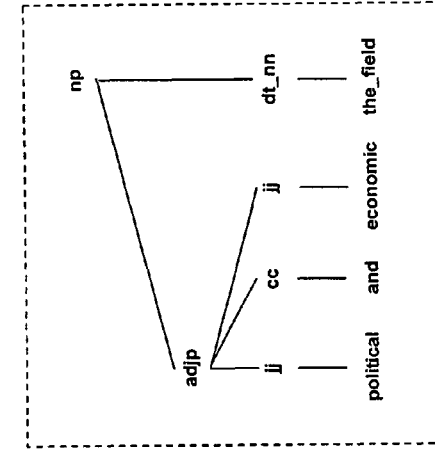
Figure 5

Figure 13
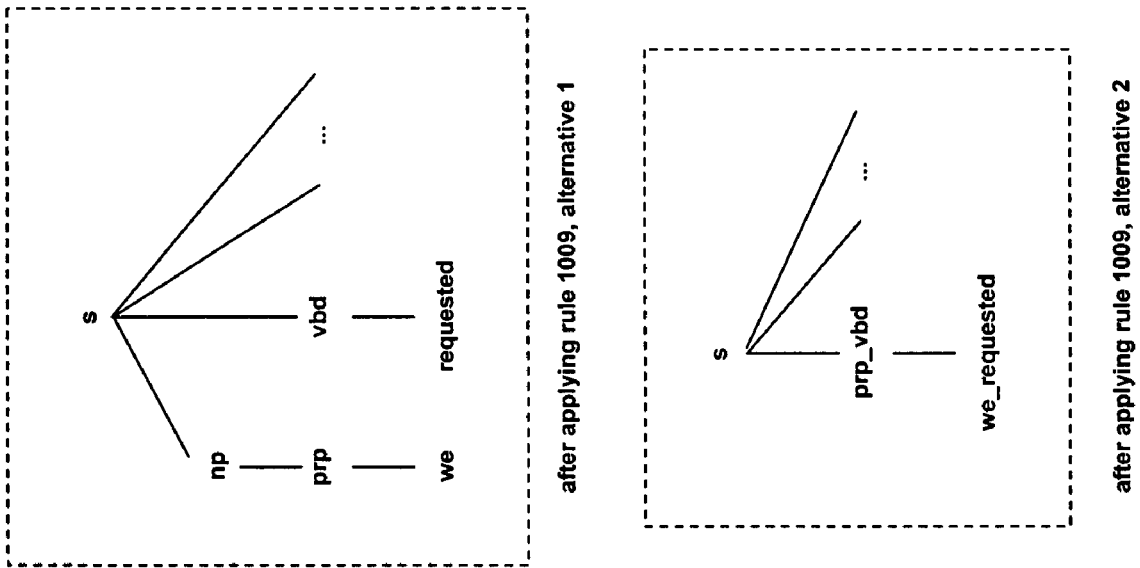
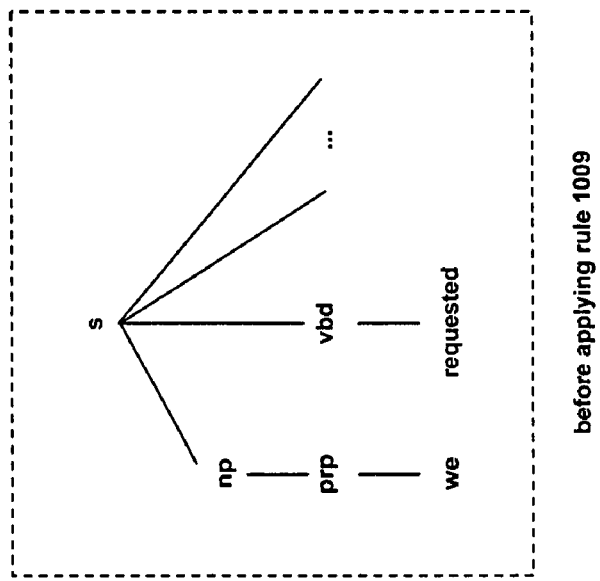

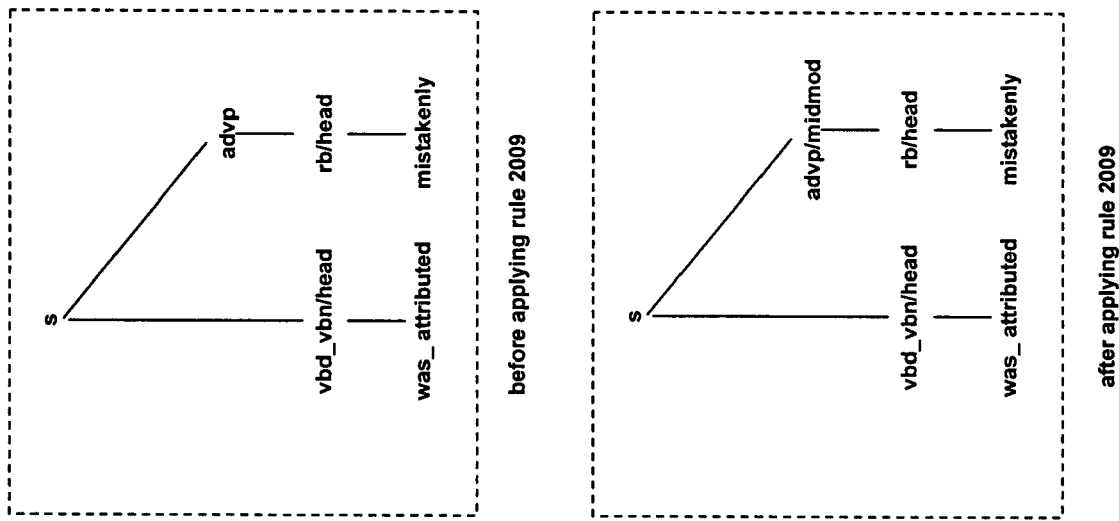
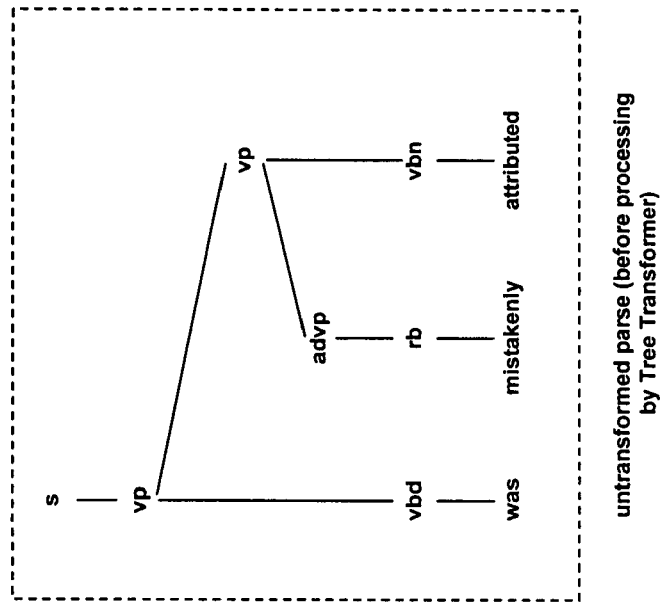
Figure 24

| LHS | RHS | | | | | | | | | | | | |
|---|---|---|---|---|---|---|---|---|---|---|---|---|---|
| | 1 | | | | 2 | | | | ... | n | | | |
| LHS category | RHS-1 category | RHS-1 headword | RHS-1 role | RHS-1 path | RHS-2 category | RHS-2 headword | RHS-2 role | RHS-2 path | | RHS-n category | RHS-n headword | RHS-n role | RHS-n path |
| LHS headword | | | | | | | | | | | | | |

A_Production type

Figure 28

| B_Variable type |
| --- |
| Category |
| Head word |
| Complement set |
| Left edge |
| Right edge |
| A_production |
| Missing constituent |
| Inserted constituent |
| Total mismatches |

| B_Terminal type |
| --- |
| Number of words |
| Word 1 |
| Word 2 |
| Word 3 |

| LF_Production type | |
| --- | --- |
| LHS | LHS variable |
| RHS | RHS terminal |
| | Probability |

| BR_Production type | |
| --- | --- |
| LHS | LHS variable |
| RHS | RHS left variable |
| | RHS left path |
| | RHS left role |
| | RHS right variable |
| | RHS right path |
| | RHS left role |
| | Probability |

| TP_Production type | |
| --- | --- |
| LHS | LHS variable |
| RHS | RHS variable |
| | RHS path |
| | RHS role |
| | Probability |

Figure 30

METHOD AND SYSTEM OF MACHINE TRANSLATION

RELATED APPLICATION

This application claims the benefit of U.S. Provisional Application Ser. No. 60/790,076, entitled Provisional Application for Method and System of Machine Translation Using Robust Syntactic Projection and LPCFG Parsing, filed on Apr. 7, 2006, the contents of which are incorporated herein by reference in their entirety for all purposes.

BACKGROUND

1. Technical Field

This invention relates to automated machine translation, and more particularly to a method and system for machine translating text between source and destination languages.

2. Background Information

Throughout this application, various publications, patents and published patent applications are referred to by an identifying citation. The disclosures of the publications, patents and published patent applications referenced in this application are hereby incorporated by reference into the present disclosure.

Transfer-based translation systems have existed for more than 25 years as exemplified in Bennett and Slocum, 1985, ("The LRC Machine Translation System," Computational Linguistics, Volume 11, Numbers 2-3, April-September"). Such systems perform translation in three steps. First, the source language text is parsed to determine its syntactic structure. Second, the parse tree is rearranged based on a set of syntactic rules to match the natural order of the destination language. Third, the individual source language words are translated into destination language words. The resultant word sequence is a destination language translation of the source language sentence. A limitation of systems such as this is that all of the knowledge is hand-coded in a complex set of rules and dictionaries, requiring considerable time and effort by computational linguists for each language pair. Furthermore, the rules may interact in unpredictable ways, sometimes preventing any translation from being produced and sometimes producing incorrect translations. It is difficult to control the interactions between rules so that all sentences produce translations and only correct translations are produced. These difficulties are commonly referred to as the problems of "coverage" and "overgeneration."

A statistical approach to translation, referred to as a source-channel model, is described in Brown et al., 1995 (U.S. Pat. No. 5,477,451). (In standard descriptions of source-channel models, the terms source and destination are reversed from their usage in most of this document; "destination language" in the source-channel context refers to the language that is input to the translation device and "source language" is the language produced as output. In keeping with standard terminology, these terms are used in this reversed sense in discussing source-channel models, but this usage is restricted to source-channel models herein.) In this approach, knowledge is acquired automatically from examples of translated sentences, eliminating the need for hand-crafted rules and dictionaries. Furthermore, each possible translation is assigned a probability value. Therefore, there is no need to arrange rules so that only the correct translation is produced; multiple translations may be produced and the translation with e.g., the highest probability score is selected. Nevertheless, such systems have limitations. One limitation is that the channel model—which contains distortion parameters describing how word order differs between source and destination languages—does not to capture basic grammatical regularities. These regularities may be highly informative when transforming grammatical structures between languages (e.g. the transformation of an SVO (subject-verb-object order) language to a VSO (verb-subject-object order) language). A consequence of this limitation is that a large and computationally-expensive search is necessary to determine the ordering of words in the translated sentence. Furthermore, there is little assurance that the selected order is truly grammatical. A second limitation of these approaches involves the source model, which is typically an n-gram language model. Such models account only for local agreement between nearby words and provide no way to determine if entire phrases are grammatical. For those phrases that are indeed grammatical, there is no way to determine if the relationships expressed are plausible. Even if these approaches were combined, the limitations of the source and channel models yield a substantial likelihood of ungrammatical translations or of grammatical translations that are non-sensical. Such behavior may be particularly problematic when downstream automated systems attempt further processing of the translated texts (e.g. to extract a database of facts), since such systems often rely on being able to syntactically parse and analyze their inputs.

Yamada and Knight, 2003 (U.S. Patent Application 20030023423) describe a technique that attempts to overcome the aforementioned limitations by introducing an alternative channel model while retaining a source-channel formulation. Like previous work, this formulation includes a probability table that describes how words are translated from the source language to the destination language. In contrast to previous methods, this formulation assumes that the source is a syntactic parse tree rather than a simple sequence of words. A probability table is then introduced to model the possible permutations of tree nodes to account for word-order differences between languages. An additional probability table is introduced to model the insertion of destination language words that have no source language counterpart. A decoder based on this model is described in Yamada and Knight, 2002 ("A decoder for syntax-based MT," Proceedings of the 40th Annual Meeting of the Association for Computational Linguistics"). This decoder retains an n-gram language model that accounts only for local agreement between nearby words.

Other techniques depart entirely from the source-and-channel formulation of the above methods, instead taking the view that "translation is parsing" and defining a single-stage parsing model that describes the entire translation process. Examples of this approach include Wu, 1997 ("Stochastic Inversion Transduction Grammars and Bilingual Parsing of Parallel Corpora," Computational Linguistics, 23(3):377-403"), Alshawi, 2001 (U.S. Pat. No. 6,233,544), and Melamed, 2004 ("Statistical Machine Translation by Parsing," Proceedings of the 42nd Annual Meeting of the Association for Computational Linguistics").

A common characteristic of these approaches is the use of specialized grammar formalisms that synchronously express sentences in the source and destination languages: in the case of Wu, 1997, "Inversion Transduction Grammars"; in the case of Alshawi, 2001, "Collections of Head Transducers"; and in the case of Melamed, 2004, "Multitext Grammars".

A need exists for a machine translation system and method that addresses the drawbacks of the prior art.

SUMMARY

In one aspect of the present invention, a method is provided for machine translation from a source language to a destination language. The method includes receiving a sentence in the source language, and with a translingual parsing model, searching among and statistically ranking candidate parses each having elements labeled with destination language words, syntactic labels, and role labels indicating relationships between the elements. The method further includes selecting a statistically high ranked parse for the sentence; and rearranging the parse using the syntactic and role labels, in accordance with word order conventions of the destination language to generate a translingual parse of the source language sentence.

In another aspect of the invention, a method is provided for generating a translingual parsing model for machine translating a source language to a destination language. The method includes receiving a destination language treebank having parse trees of destination language sentences, the parse trees having nodes labeled with their syntactic categories. A destination language parsing model is generated using the destination language treebank, and includes parameters for ranking candidate parse trees for a destination language sentence. A second set of destination language sentences is received from a parallel corpus, the parallel corpus including destination language sentences and their respective source language equivalents. The destination language parsing model is applied to the second set of destination language sentences to generate a ranked list of candidate parse trees for each sentence thereof. These candidate parse trees are transformed by applying a rule set associated with linguistic characteristics of the source and destination languages. Linguistic role labels are assigned to nodes of the candidate parse trees, in which the role labels correspond to the linguistic role of a node within its respective parse tree. Grammar constraints are extracted from portions of each candidate parse tree. The translingual parsing model is then estimated using the extracted grammar constraints and source language sentences of the parallel corpus, so that the translingual parsing model includes parameters sufficient to rank candidate parses, wherein the parameters relate elements of the candidate parses including source language words, destination language words, syntactic labels, and role labels.

In yet another aspect of the invention, a system is provided for machine translation from a source language to a destination language. The system includes a translation module configured for receiving a sentence in the source language, a translingual parsing model configured for searching among and statistically ranking a plurality of candidate parses. The candidate parses each have elements labeled with destination language words corresponding to words of the source language sentence, syntactic labels indicating a syntactic category of the elements, and role labels indicating relationships between the elements. A parser is configured for selecting the highest statistically ranked parse for the sentence. A reordering module is configured for rearranging at least one of the ranked parses using the syntactic and role labels in accordance with word order conventions of the destination language, to generate a translingual parse of the source language sentence.

In still another aspect, a system is provided for generating a translingual parsing model for machine translating a source language to a destination language. This system includes a parser training module configured for receiving a destination language treebank having parse trees of destination language sentences, the parse trees having nodes labeled with their syntactic categories. The parser training module is configured for generating, using the destination language treebank, a destination language parsing model, including parameters for ranking candidate parse trees for a destination language sentence. A destination language parser receives the destination language parsing model and a second set of destination language sentences from a parallel corpus, the parallel corpus including the second plurality of destination language sentences and their respective source language equivalents. The destination language parser is configured for applying the destination language parsing model to the second set of destination language sentences to generate a ranked list of candidate parse trees for each sentence thereof. A tree transformer is configured for transforming the candidate parse trees by applying a rule set associated with linguistic characteristics of the source and destination languages. A role labeler is configured to assign a linguistic role label to nodes of the candidate parse trees, the role label corresponding to the linguistic role of a node within its respective parse tree. An extraction module is configured for extracting grammar constraints from portions of each candidate parse tree. A translingual grammar estimator is configured for estimating the translingual parsing model using the extracted grammar constraints and source language sentences of the parallel corpus, so that the translingual parsing model includes parameters sufficient to rank candidate parses, wherein the parameters relate elements of the candidate parses including source language words, destination language words, syntactic labels, and role labels.

In still another aspect, an article of manufacture is provided for machine translating a source language into a destination language. The article of manufacture includes a computer usable medium having a computer readable program code embodied therein. The computer usable medium has computer readable program code for receiving, at a translation module, at least one sentence in the source language. Program code is also provided for searching among and statistically ranking, with a translingual parsing model, a plurality of candidate parses each parse having elements labeled with destination language words corresponding to words of the source language sentence, syntactic labels indicating a syntactic category of the elements, and role labels indicating relationships between the elements. Program code is also provided for selecting the highest statistically ranked parse for the at least one sentence; and rearranging the parse using the syntactic and role labels, in accordance with word order conventions of the destination language to generate a translingual parse of the source language sentence.

In still another aspect of the invention, an automated translation machine is provided for translating a source language into a destination language. The translation machine includes means for receiving a sentence in the source language, and means for searching among and statistically ranking candidate parses. The candidate parses each have elements labeled with destination language words corresponding to words of the source language sentence, syntactic labels indicating a syntactic category of the elements, and role labels indicating relationships between the elements. Means are also provided for selecting the highest statistically ranked parse for the sentence, and means for rearranging the parse using the syntactic and role labels in accordance with word order conventions of the destination language to generate a translingual parse of the source language sentence.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIGS. 5 to 14 are examples of various rules used by an embodiment of a tree-transformer module of the present invention;

FIGS. 16 to 26 are examples of various rules used by an embodiment of a role-labeler of the present invention;

FIG. 28 is an example of type-a production data fields used by the embodiments of the present invention;

FIG. 30 is an example of Type-b grammar elements and data fields used by embodiments of the present invention;

DETAILED DESCRIPTION

Figure 1:
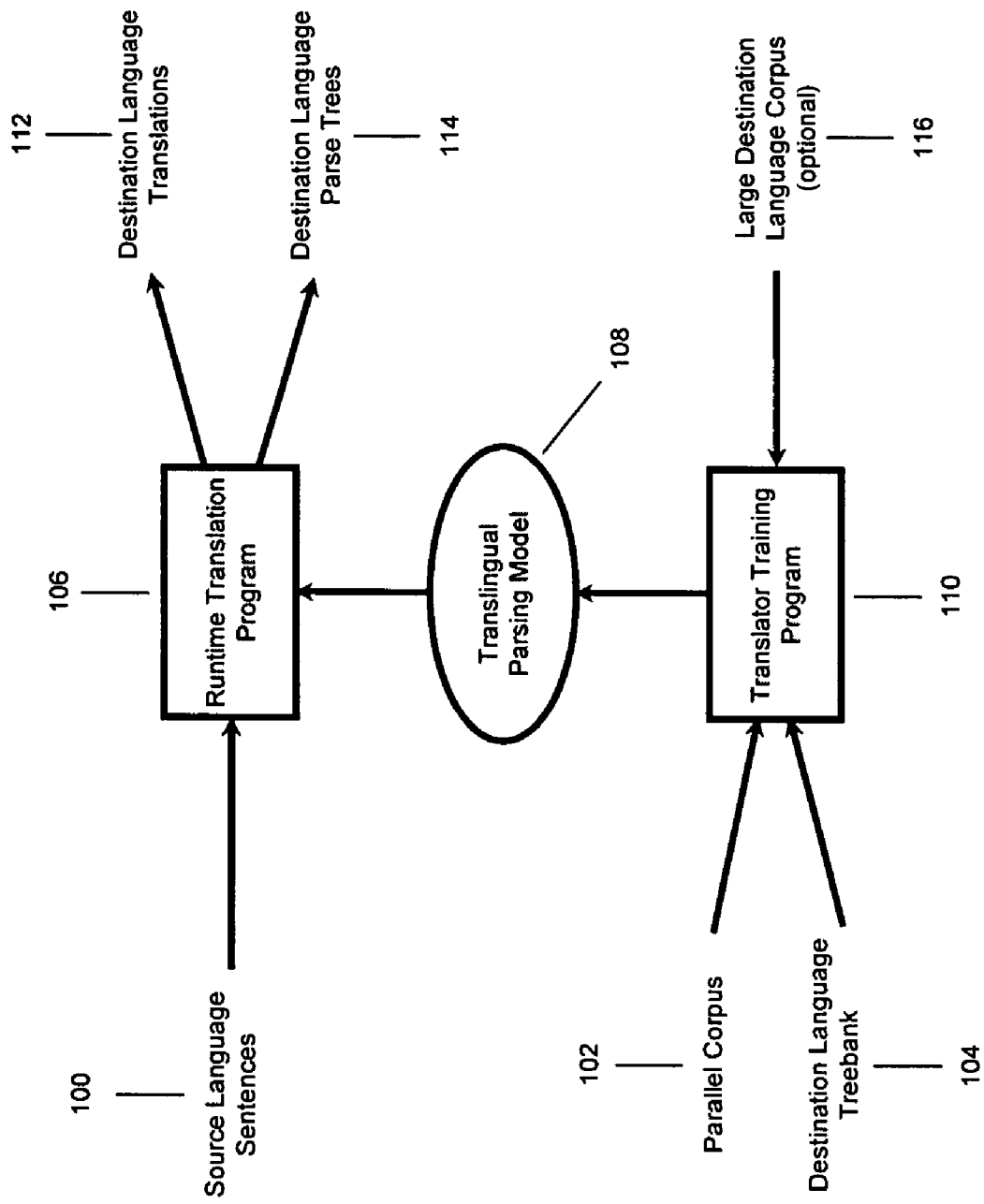
FIG. 1 is a high level functional block diagram of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Referring to Figures, embodiments of the present invention are shown. Unlike transfer-based systems such as Bennett and Slocum, 1985, these embodiments automatically learn the required detailed knowledge from data, eliminating the need for a large volume of hand-written rules, e.g., rules that are customized for each particular language. These embodiments consider a wide range of possible translations for each source language sentence and assign a probability to each candidate, thereby overcoming the problems of coverage and overgeneration of conventional rule-based systems discussed above. The relatively few rules used by these embodiments are of a general nature and can be quickly determined by consulting a grammar primer for any particular language of interest.

Embodiments of the present invention include a computer-based method and system for translating word sequences in a source language (e.g. Arabic) into word sequences in a destination language (e.g. English). These embodiments are based on statistical algorithms in which parameter values are estimated from at least two data resources: a parallel corpus and a destination language treebank. A large collection of destination language sentences (e.g., a destination language corpus) may optionally be used to further refine the parameter estimates. These embodiments may also use a small amount of general linguistic knowledge contained in various rule sets.

Figure 2:
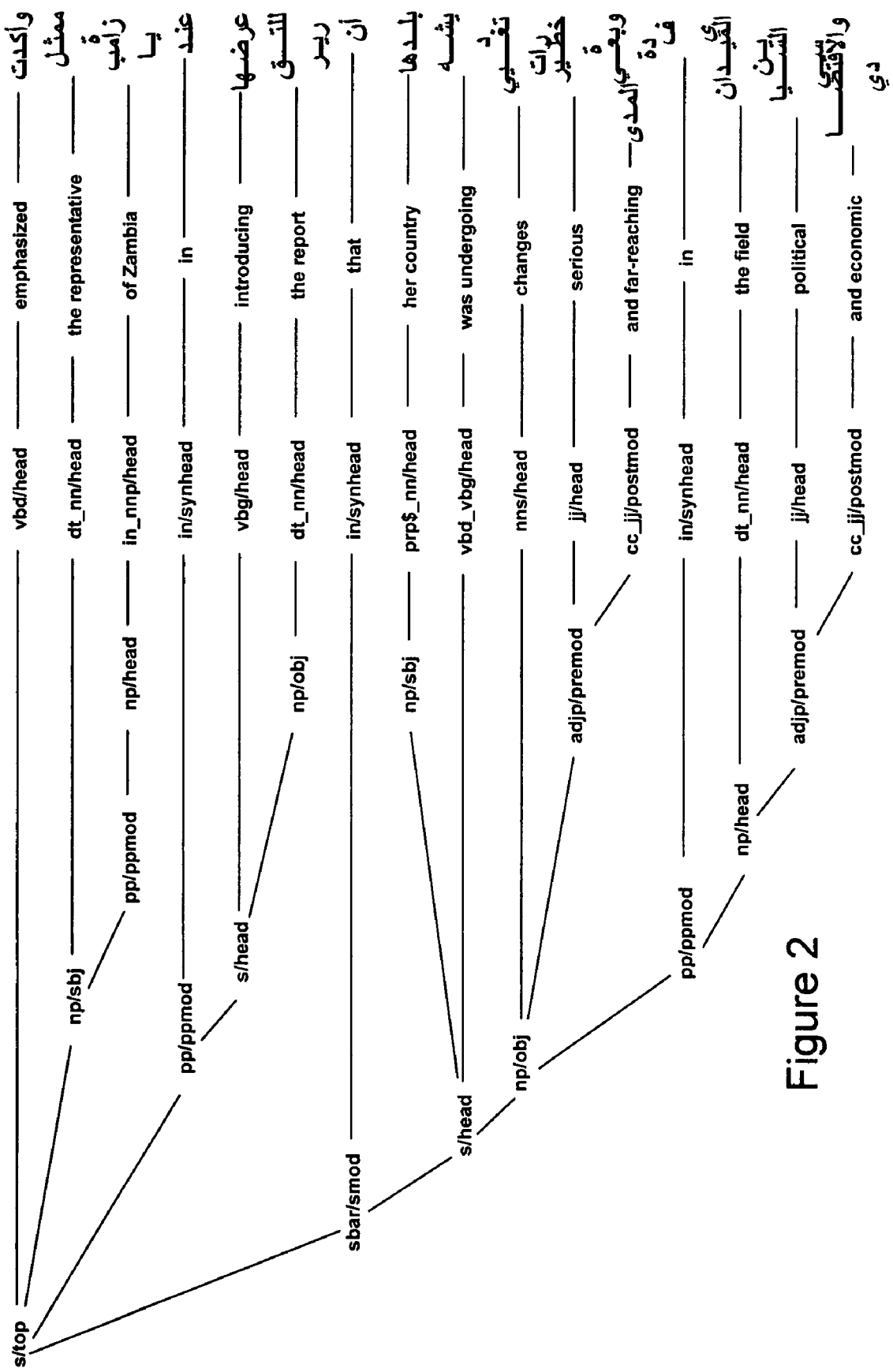
FIG. 2 is an exemplary translingual parse tree used by the embodiment of FIG. 1.
Figure 32:
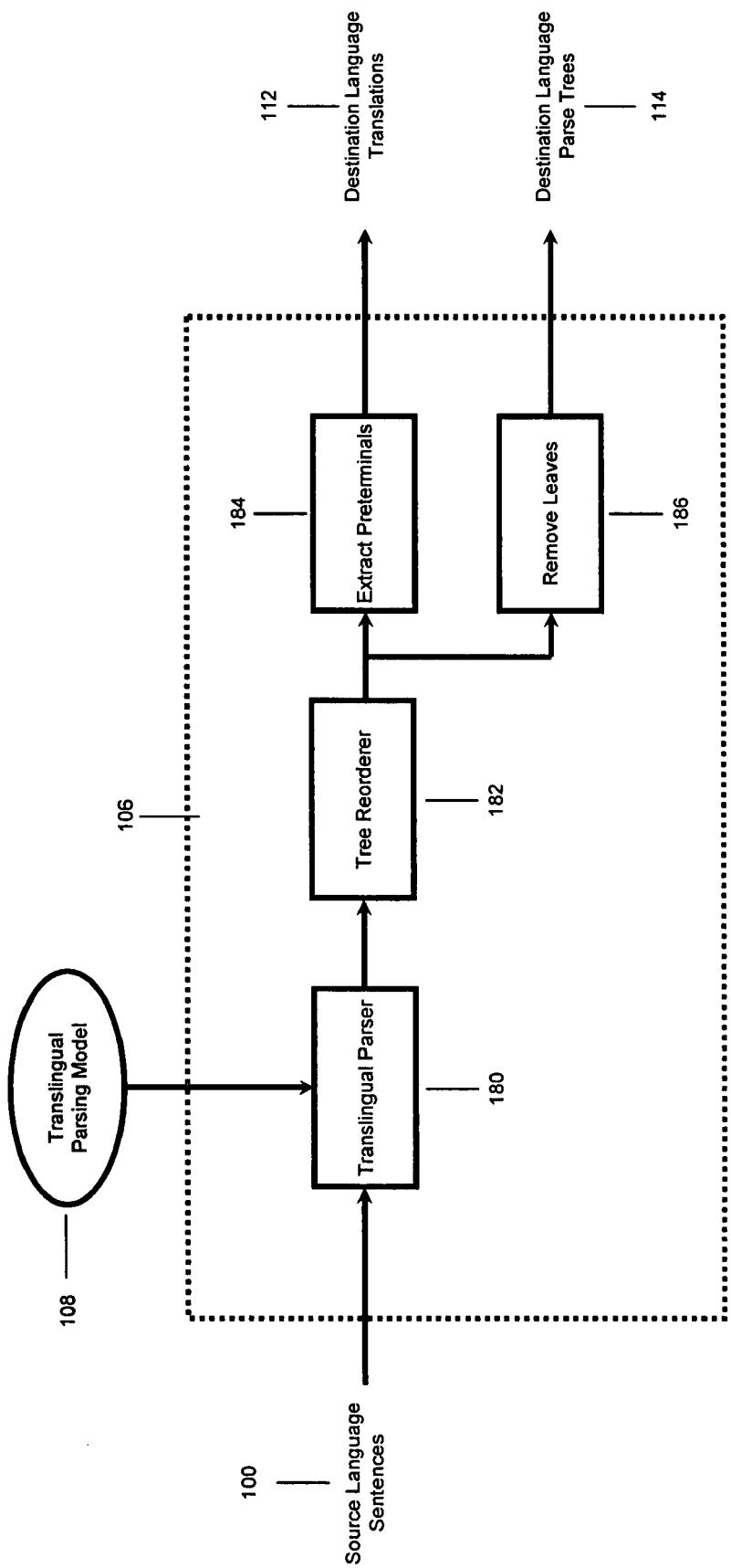
FIG. 32 is a functional block diagram of a Runtime Translation Program portion of the embodiment of FIG. 1.

As shown in FIG. 32, translation is accomplished by parsing a source language sentence to produce a parse tree. As in a typical syntactic parse tree, the resultant parse contains nodes that are labeled with syntactic categories. Unlike a typical parse tree, there is an additional layer of nodes directly dominating the leaves; these pre-terminal nodes are labeled with destination language words. Also unlike a typical parse tree, each node—except the pre-terminal nodes—contains a second label indicating its linguistic relationship (i.e., its 'role') relative to its parent node (e.g. SBJ for subject). This type of parse tree is referred to herein as a translingual parse tree (or simply a translingual parse, such as to refer to portions thereof). An example of such a translingual parse tree is shown in FIG. 2.

Once a translingual parse tree has been obtained for a source language sentence, a simple set of rules is used to rearrange the nodes in accordance with word-order conventions of the destination language. This rearrangement is facilitated by the linguistic-relationship (role) labels in the translingual parse tree. Once the nodes have been rearranged, a second set of rules may be applied to extract the destination language words in the order given by the rearranged tree. The resultant word sequence is a destination language translation of the source language sentence.

Alternatively, if the translated output is intended for further automated processing (e.g. by an information extraction system) the rearranged tree—with its source language leaves removed—may be output instead of the word sequence, thereby providing a destination language parse of the source language sentence.

Unlike statistical models such as the aforementioned Brown et al., 1995 approach, embodiments of the present invention account for grammatical regularities when transforming word order between languages (e.g. from an SVO language to a VSO language). Furthermore, these embodiments account for long-distance dependencies between head words and their modifiers. These characteristics lead to translations that tend to be more grammatical and semantically coherent, particularly when the source and destination languages are structurally dissimilar. In addition, accounting for grammatical regularities serves to reduce the search space, resulting in a more computational-efficient translation process.

Unlike syntax-based channel models such as the aforementioned Yamada and Knight, 2003, embodiments of the present invention are based on a single-stage statistical model that has no separate source and channel components. It requires no probability tables for specifying permutations or word insertions; instead it transforms word order and handles insertions far more efficiently by applying small amounts of general linguistic knowledge. Furthermore, it requires no specialized decoder such as in Yamada and Knight, 2002. Decoding may be performed using a conventional parsing model of the type commonly used for syntactic parsing, e.g., an LPCFG (Lexicalized Probabilistic Context-Free Grammar) similar to that disclosed in Collins, 97, "Three Generative, Lexicalised Models for Statistical Parsing," Proceedings of the 35th Annual Meeting of the ACL". Additionally, the lexicalized characteristic of the models eliminates the need for a separate n-gram language model and facilitates long-distance dependencies between words.

Unlike the "translation-as-parsing" approaches of Wu, 1997, Alshawi, 2001, and Melamed, 2004, no synchronous grammar is required; the grammar is simply an LPCFG, just as for standard monolingual parsing. There is no need to synchronously account for word order in both languages. Rather, syntactic-relationship information embedded in the translingual parse, together with a small set of general linguistic rules, enables a destination language translation to be synthesized in a natural canonical order.

Embodiments of the present invention offer additional advantages over previous methods in estimating its statistical model. Previous syntax-based models assume that the trees obtained by automatically parsing the destination language side of a parallel corpus are correct; in reality, existing parsers make substantial numbers of errors. Previous models further assume that identical linguistic dependencies exist in source language sentences and their destination language translations. In reality, while many linguistic dependencies are shared between source and destination languages, there are substantial numbers of differences. Such assumptions may lead to numerous alignment errors in estimating statistical translation models. Embodiments of the present invention account for parsing inaccuracies and for mismatched dependencies between languages, leading to higher-quality alignments and ultimately to more accurate translations.

Data sparseness is often a limiting factor in estimating statistical models, particularly for models involving large numbers of individual words. Previous source-channel formulations partially overcome this limitation by introducing a separate n-gram language model that is separately estimated using a large quantity of monolingual text. However, these models are limited in scope to a few neighboring words. Embodiments of the present invention overcome this limitation by optionally utilizing a large collection of destination language sentences to refine its parsing model. Unlike a separate n-gram source model, the refined estimates of these embodiments are part of the parsing model itself and are thus capable of accounting for dependencies between widely separated words.

A characteristic of many of these embodiments is that their parameter values may be estimated using only a parallel corpus and a destination language syntactic treebank such as the University of Pennsylvania Treebank described by Marcus et al., 1994 "Building a Large Annotated Corpus of English: The Penn Treebank," Computational Linguistics, Volume 19, Number 2". No treebank is required for the source language. This characteristic may be particularly advantageous for translating some foreign language texts into English, since a treebank is readily available for English but may not be for many other languages. Similarly, as mentioned above, a large destination language corpus may be used to further refine the parameters of the destination language. If the destination language is English, then a virtually unlimited amount of text is available for this purpose.

As mentioned hereinabove, if the output of the translation system is intended for further automated processing (e.g. by an information extraction system), then these embodiments are capable of producing a destination language parse of the source language sentence. Thus, the commonly-encountered problem of parsing ungrammatical translations by downstream processing components is reduced or eliminated.

Where used in this disclosure, the term "computer" is meant to encompass a workstation, server, personal computer, notebook PC, personal digital assistant (PDA), Pocket PC, smart phone, or any other suitable computing device.

The system and method embodying the present invention can be programmed in any suitable language and technology including, but not limited to: C++; Visual Basic; Java; VBScript; Jscript; BCMAscript; DHTM1; XML; CGI; Hypertext Markup Language (HTML), Active ServerPages (ASP); and Javascript. Any suitable database technology can be employed, but not limited to: Microsoft Access and IMB AS 400.

Referring now to the Figures, embodiments of the present invention will be more thoroughly described.

As shown in FIG. 1, an exemplary translation system consists of three top-level components: a translator training program 110, a translingual parsing model 108, and a runtime translation program 106.

In particular embodiments, the translator training program receives a destination language treebank 104, and a parallel corpus 102, and produces translingual parsing model 108. The destination language treebank includes parses of destination language sentences annotated with syntactic labels indicating the syntactic category of elements of the parse. An example of a suitable destination language Treebank is the aforementioned University of Pennsylvania Treebank (Marcus et al., 1994). Any number of syntactic labels known to those skilled in the art may be used in embodiments of the present invention. Examples of suitable syntactic labels include those used with the University of Pennsylvania Treebank, such as shown in the following Tables 1 and 2.

TABLE 1

The Penn Treebank POS tagset

| | | |
|---|---|---|
| 1. | CC | Coordinating conjunction |
| 2. | CD | Cardinal number |
| 3. | DT | Determiner |
| 4. | EX | Existential there |
| 5. | FW | Foreign word |
| 6. | IN | Preposition/subord. conjunction |
| 7. | JJ | Adjective |
| 8. | JJR | Adjective, comparative |
| 9. | JJS | Adjective, superlative |
| 10. | LS | List item marker |
| 11. | MD | Modal |
| 12. | NN | Noun, singular or mass |
| 13. | NNS | Noun, plural |
| 14. | NNP | Proper noun, singular |
| 15. | NNPS | Proper noun, plural |
| 16. | PDT | Predeterminer |
| 17. | POS | Possessive ending |
| 18. | PRP | Personal pronoun |
| 19. | PP$ | Possessive pronoun |
| 20. | RB | Adverb |
| 21. | RBR | Adverb, comparative |
| 22. | RBS | Adverb, superlative |
| 23. | RP | Particle |
| 24. | SYM | Symbol |
| 25. | TO | to |
| 26. | UH | Interjection |
| 27. | VB | Verb, base form |
| 28. | VBD | Verb, past tense |
| 29. | VBG | Verb, gerund/present participle |
| 30. | VBN | Verb, past participle 218z |
| 31. | VBP | Verb, non-3rd ps. sing. present |
| 32. | VBZ | Verb, 3rd ps. sing. present |
| 33. | WDT | wh-determiner |

TABLE 1-continued

The Penn Treebank POS tagset

| 34. | WP | wh-pronoun |
| 35. | WP$ | Possessive wh-pronoun |
| 36. | WRB | wh-adverb |
| 37. | # | Pound sign |
| 38. | $ | Dollar sign |
| 39. | . | Sentence-final punctuation |
| 40. | , | Comma |
| 41. | : | Colon, semi-colon |
| 42. | ( | Left bracket character |
| 43. | ) | Right bracket character |
| 44. | " | Straight double quote |
| 45. | ` | Left open single quote |
| 46. | `` | Left open double quote |
| 47. | ' | Right close single quote |
| 48. | '' | Right close double quote |

TABLE 2

The Penn Treebank syntactic tagset

| 1. ADJP | Adjective phrase |
| 2. ADVP | Adverb phrase |
| 3. NP | Noun phrase |
| 4. PP | Prepositional phrase |
| 5. S | Simple declarative clause |
| 6. SBAR | Clause introduced by subordinating conjunction or 0 (see below) |
| 7. SBARQ | Direct question introduced by wh-word or wh-phrase |
| 8. SINV | Declarative sentence with subject-aux inversion |
| 9. SQ | Subconstituent of SBARQ excluding wh-word or wh-phrase |
| 10. VP | Verb phrase |
| 11. WHADVP | Wh-adverb phrase |
| 12. WHNP | Wh-noun phrase |
| 13. WHPP | Wh-prepositional phrase |
| 14. X | Constituent of unknown or uncertain category |

The parallel corpus 102 includes sentence-aligned pairs of source language sentences and destination language translations. In addition, a large destination language corpus 116 may optionally be received by the training program to further refine the translingual parsing model. The large destination language corpus, if used, includes a collection of unannotated destination language sentences.

The runtime translation program 106 receives the translingual parsing model 108 and a collection of source language sentences 100, and produces destination language translations 112. Optionally, the runtime translation program produces destination language parse trees 114. The destination language parse trees 114, include syntactic parses of the destination language translations, such as shown in FIG. 2. In addition, or as an alternative, the source language words may be removed from the parse tree 114 to leave a destination language parse that may be used, e.g., for further processing as discussed in greater detail hereinbelow.

Translator Training Program

Figure 3:
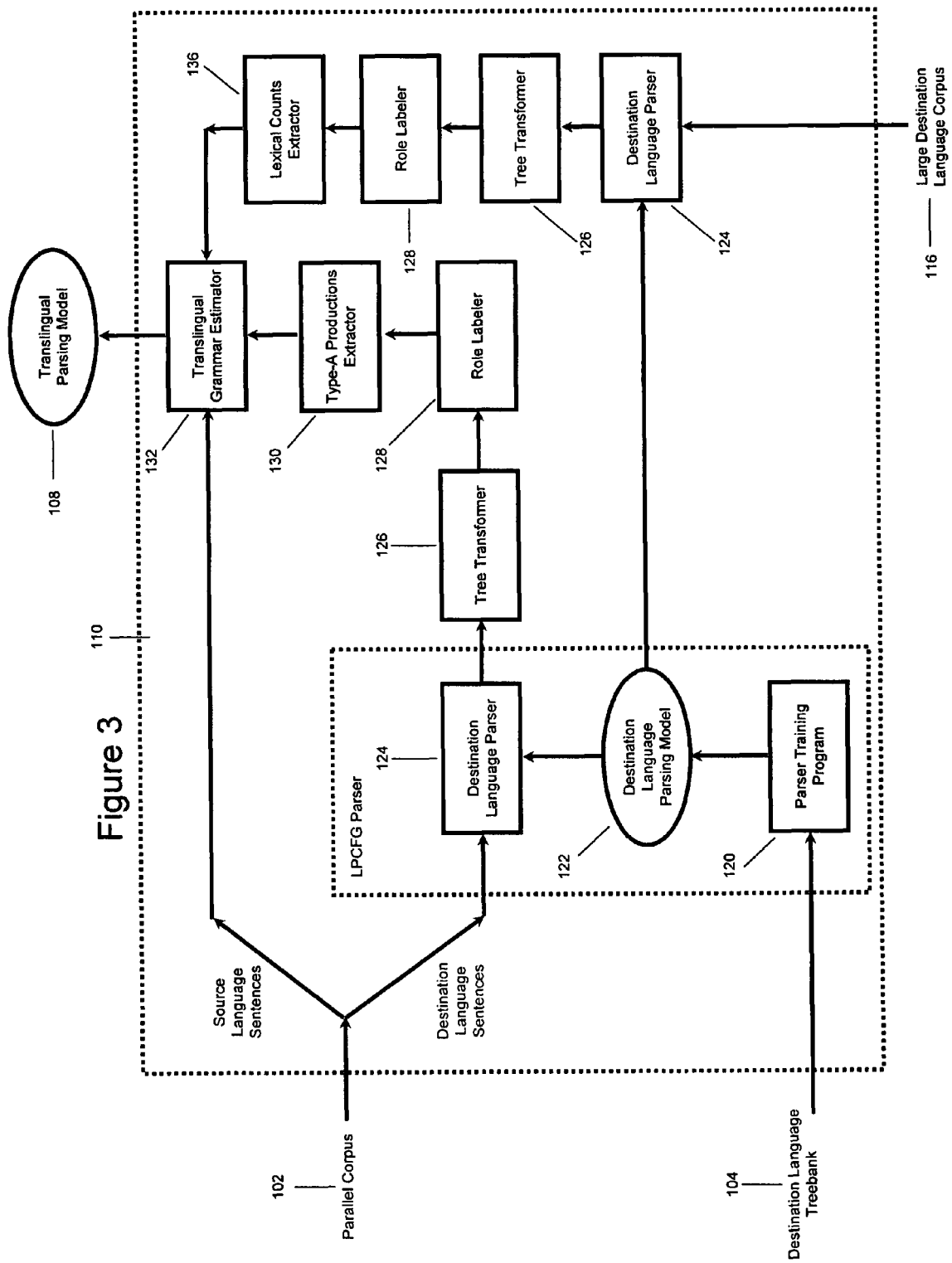
FIG. 3 is a detailed functional block diagram of a portion of the embodiment of FIG. 1.

Turning now to FIG. 3, the translator training program 110 is described in detail.

As shown, in particular embodiments, three components provide a mechanism for syntactically parsing destination language sentences: a parser training program 120, a destination language parsing model 122, and a destination language parser 124. This combination of components implements a LPCFG (lexicalized probabilistic context-free grammar) parser. A LPCFG parser such as disclosed in Collins 1997 may be used for this purpose. Although not required, in particular embodiments, the parser produces a ranked n-best list of possible parses, rather than only the single highest scoring parse. Suitable techniques for producing n-best lists of parse trees are well known, for example as disclosed by Charniak and Johnson, 2005, "Coarse-to-fine n-best parsing and MaxEnt discriminative reranking," Proceedings of the 43rd Annual Meeting of the Association for Computational Linguistics".

Destination language sentences from the parallel corpus 102 arrive at the destination language parser 124. Applying the destination language parsing model 122, the destination language parser produces a list of candidate parses for each destination language sentence. This list includes the highest scoring parse, as well as all other parses that have reasonably high scores (e.g. within 50% of the highest scoring parse).

The list of candidate parses is received by a tree transformer 126, which applies simple, general, linguistic rules to transform each tree into a form that is closer the source language. (While the linguistic rules are simple and general, they are language specific and different rules are needed for each language pair. In the examples provided herein, the source language is Arabic and the destination language is English.) These transformations do not account for differences in word order, but rather account for differences in 1) morphology and 2) phrase structure. The rules are not strictly deterministic: if a source language construct is expressible using one of several alternative destination language constructs, the tree transformer 126 produces alternative outputs for each possibility. Therefore, for each tree received as input, the tree transformer 126 will typically produce several alternative transformed trees as output. The following Table 3 lists a set of 10 rules used in the prototype (exemplary) Arabic-to-English system.

TABLE 3

| Rule # | Rule |
|---|---|
| 1001 | If an NP begins with an article (a, the) or a possessive pronoun (his, her, . . .), attach* the article/pronoun to the head noun |
| 1002 | If a phrase includes a conjunction (and), attach the conjunction to the head word of the following node |
| 1003 | If a VP consists of an infinitive (to), an auxiliary, or a modal, followed by a nested VP, flatten the verb group and attach the infinitive/auxiliary/modal to the main verb |
| 1004 | If a VP is headed by a copular verb (is, are, . . .) and followed by an adjectival, nominal, or sentential predicate (ADJP, NP, S, . . .), attach the copula to the head word of the following predicate |
| 1005 | If an NP includes a nested core NP, flatten the NP to a single level |
| 1006 | If an S is headed by a VP, eliminate the VP layer, collapsing its contents into the S. |
| 1007 | If a PP contains a preposition followed by an NP, then create two alternatives. In alternative 1, leave the prepositional phrase unaltered. In alternative 2, attach the preposition to the head word of the NP. |
| 1008 | For all possessive NPs, insert an additional NP containing all nodes preceding the apostrophe. Create two alternatives. In alternative 1, perform no further transformation. In alternative 2, attach the apostrophe to the head word of the inserted NP. |
| 1009 | If the subject of an S is a pronoun, then create two alternatives. In alternative 1, retain the separate pronoun. In alternative 2, attach the pronoun to the head verb. |
| 1010 | If the object of an S is a personal pronoun (him, her, . . .), attach the pronoun to the head verb. |

*Wherever two words are attached, their POS tags are also attached

Figure 4:
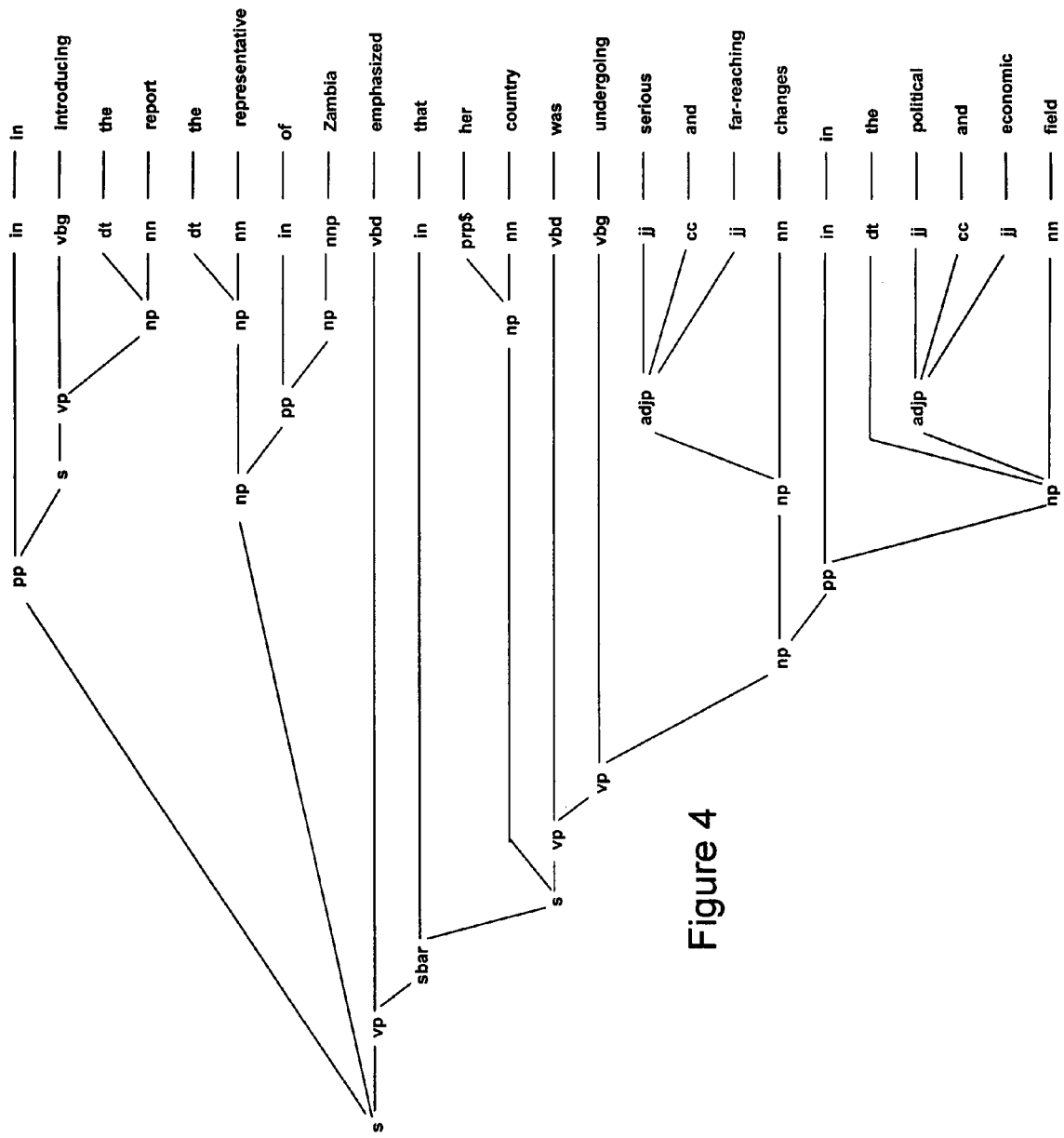
FIG. 4 is an exemplary destination language parse tree used by the embodiment of FIG. 1.
Figure 8:
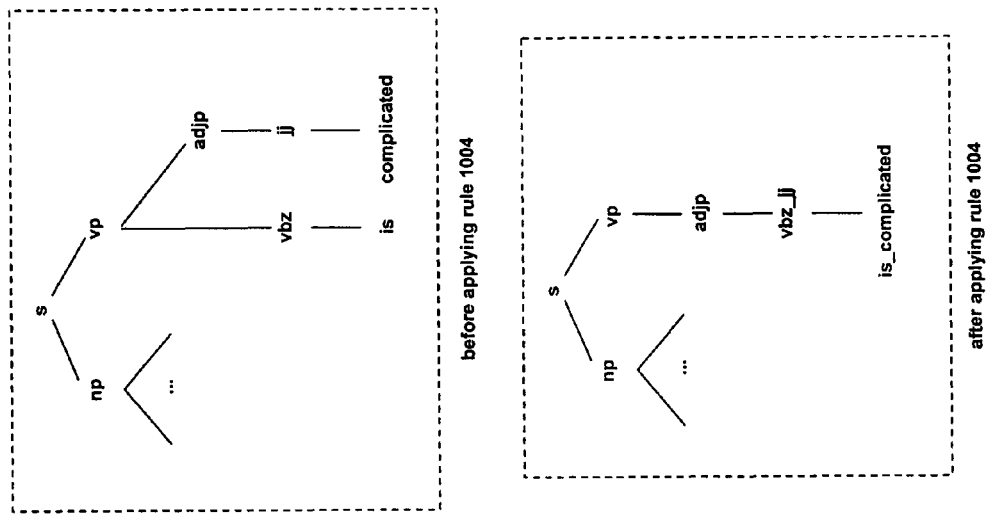
Figure 7:
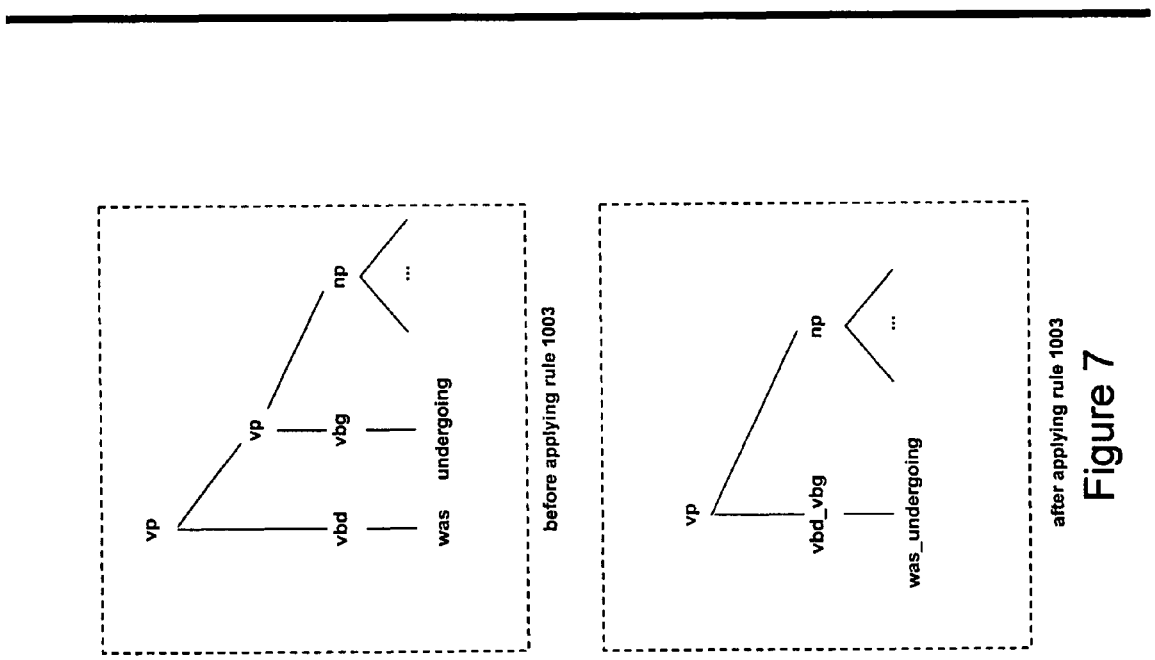
Figure 10:
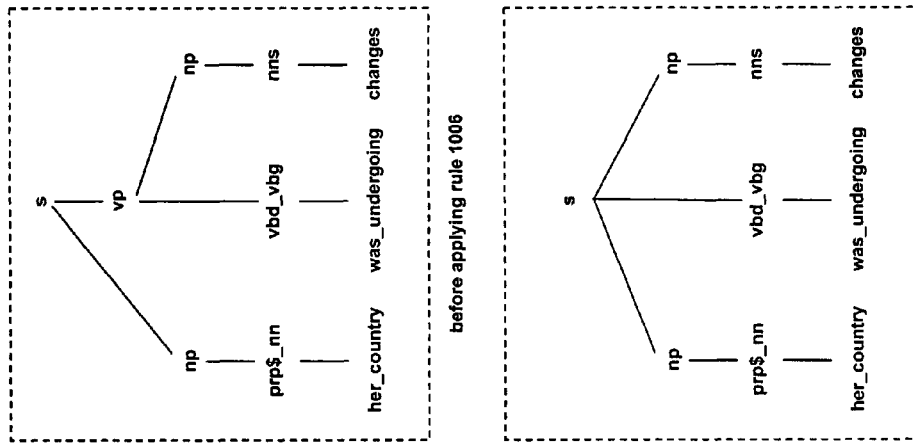
Figure 9:
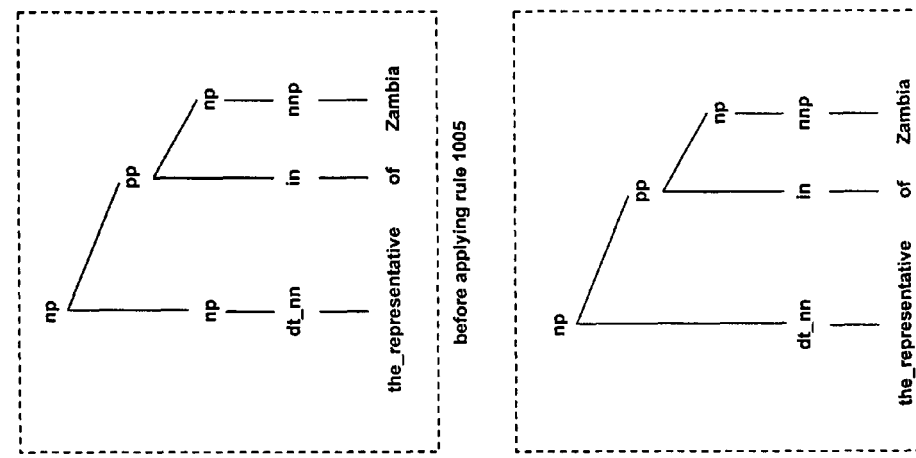
Figure 11:
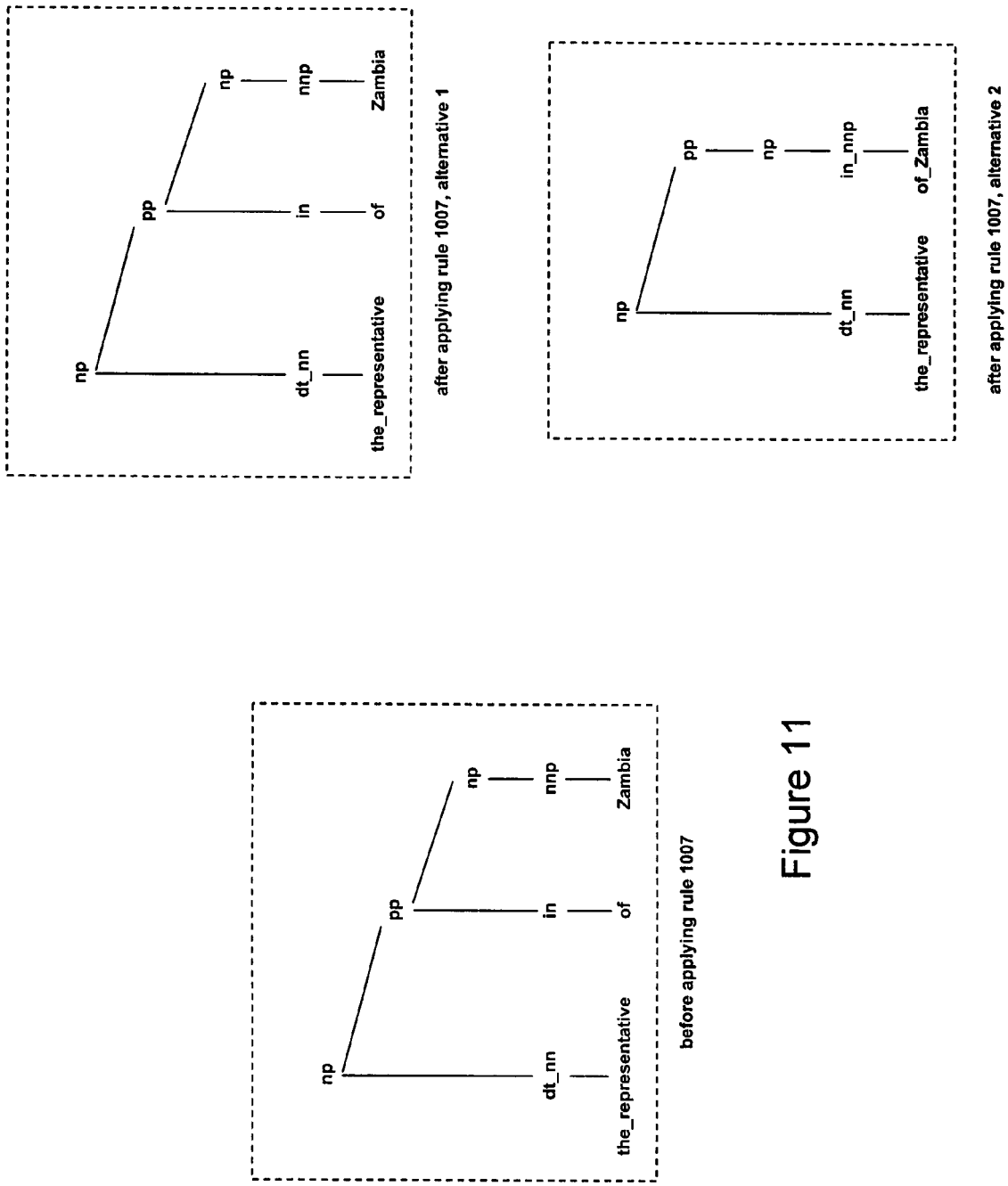
Figure 12:
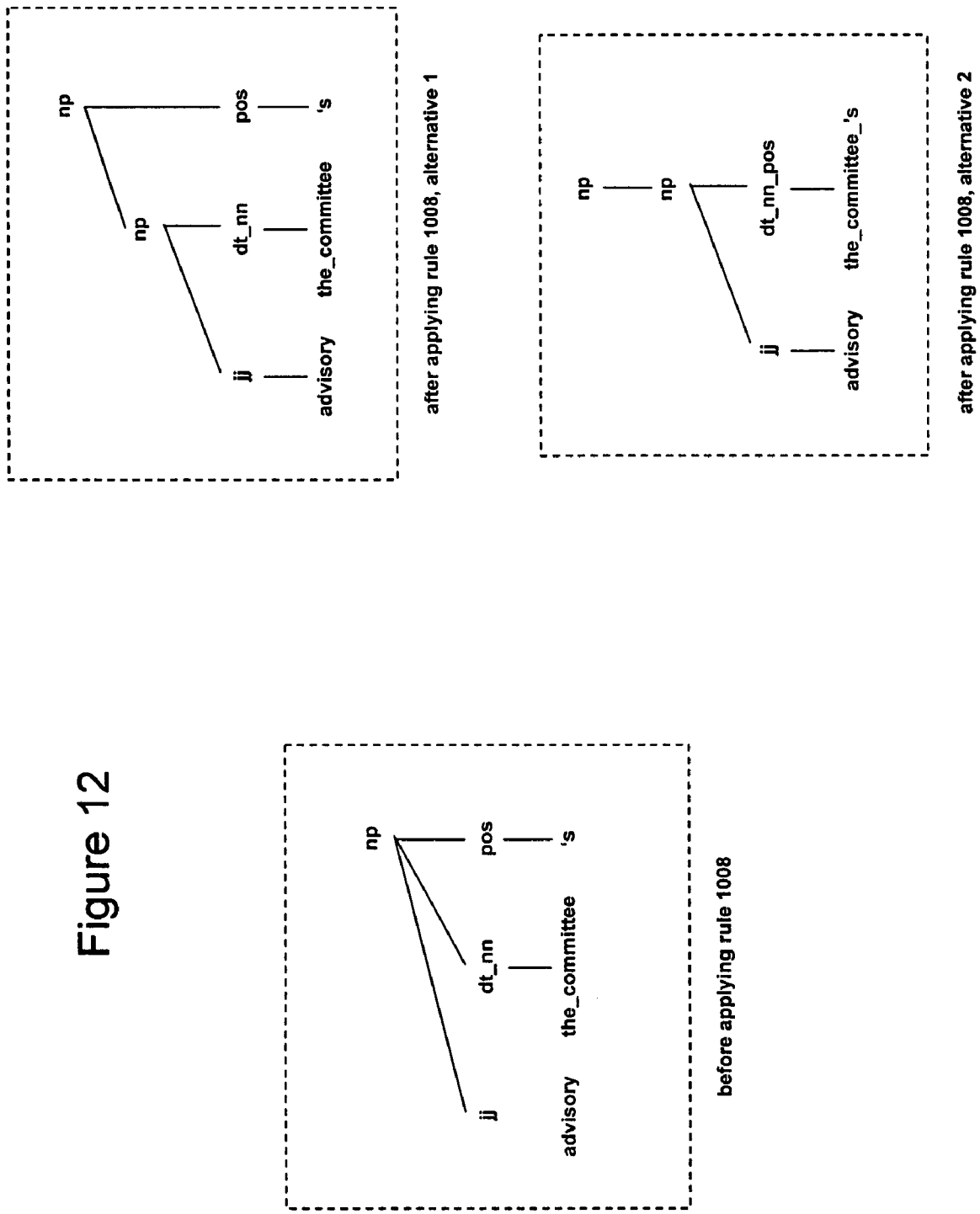
Figure 14:
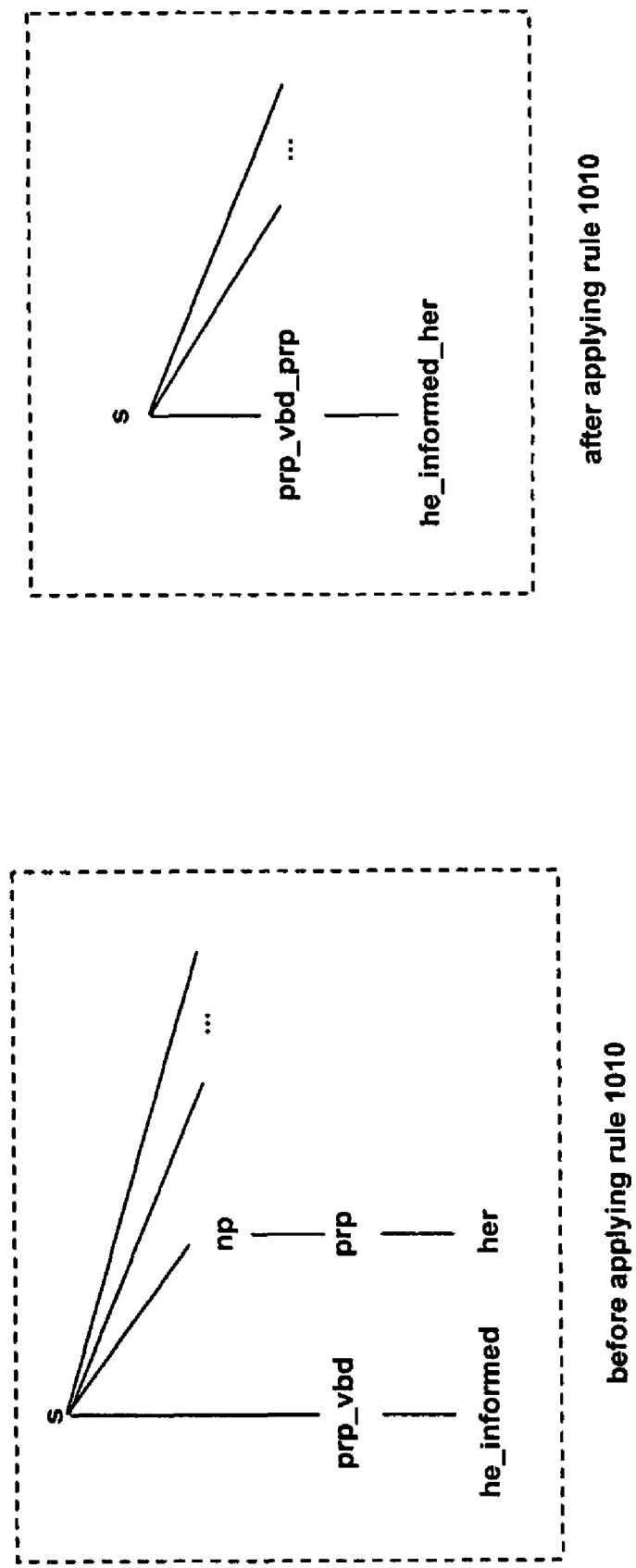
Figure 15:
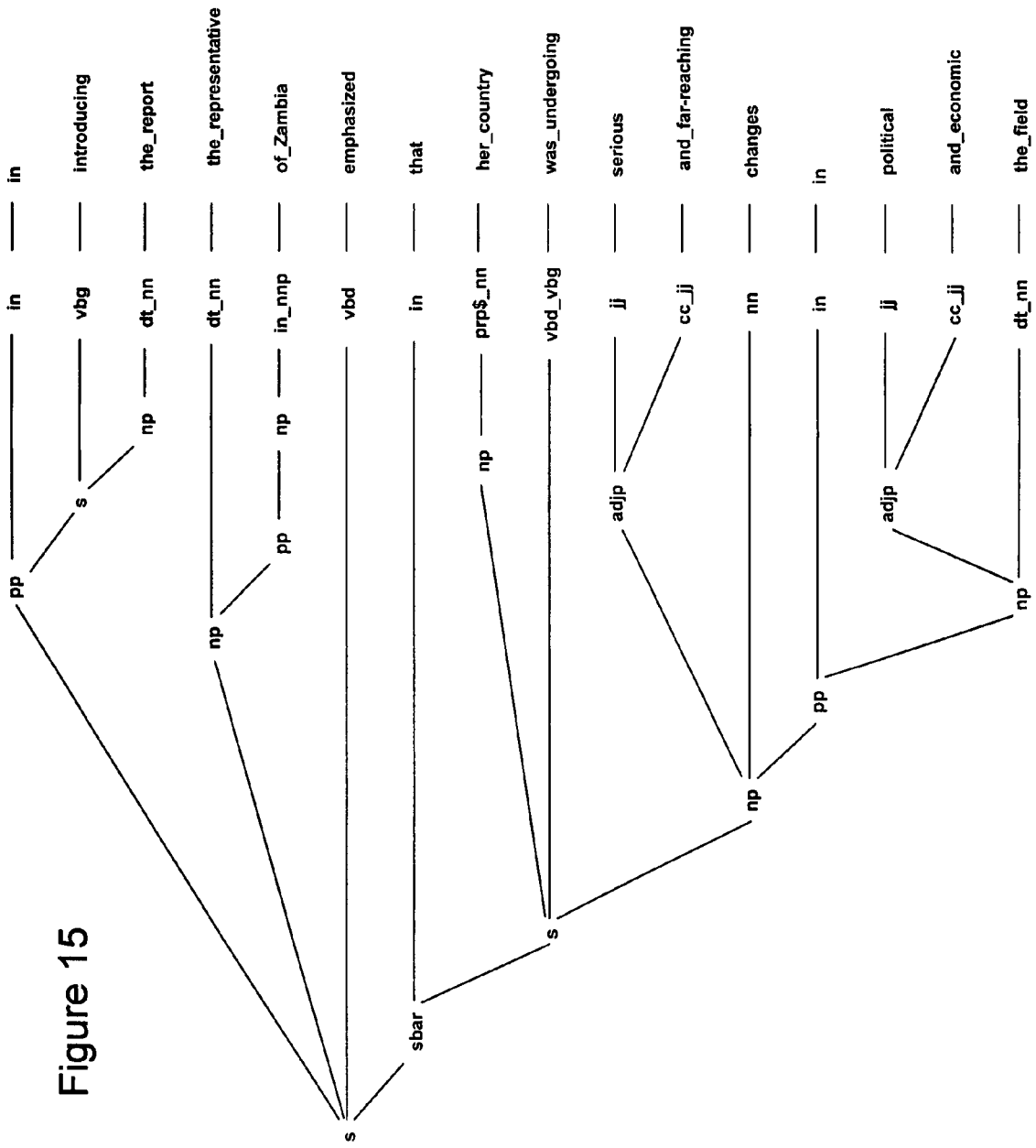
FIG. 15 is an example of a transformed tree generated by the tree-transformer of FIGS. 5 to 14.
Figure 17:
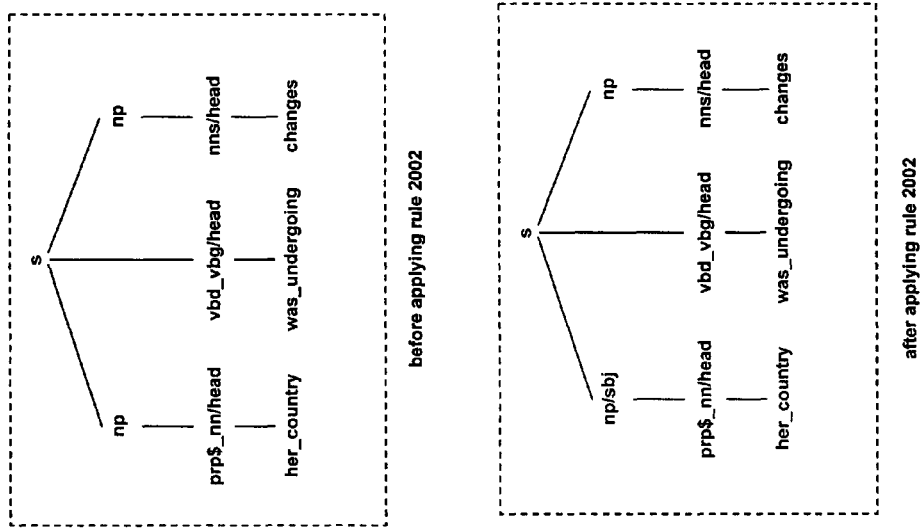
Figure 16:
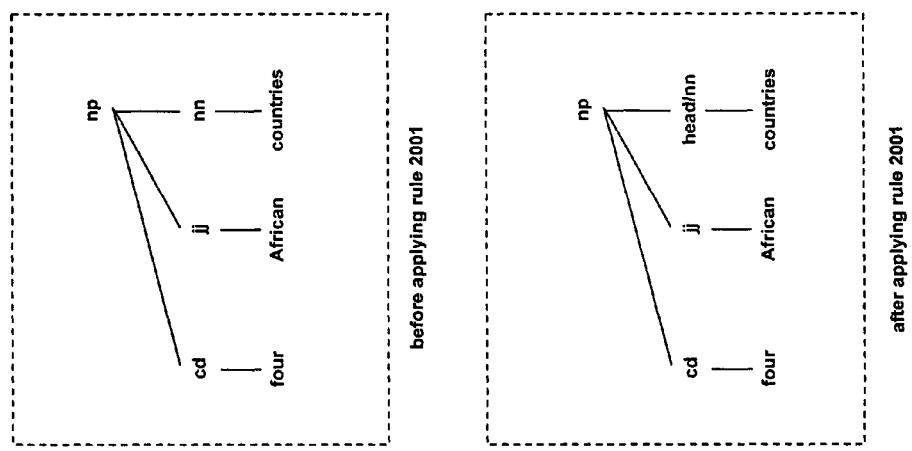
Figure 19:
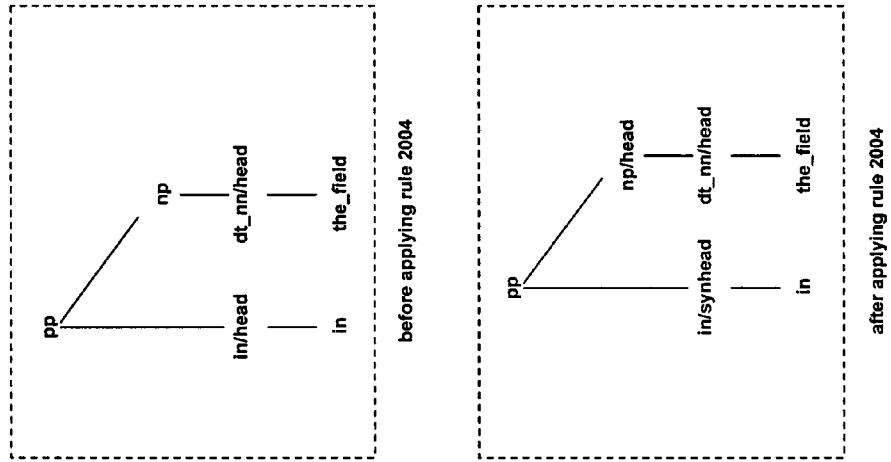
Figure 18:
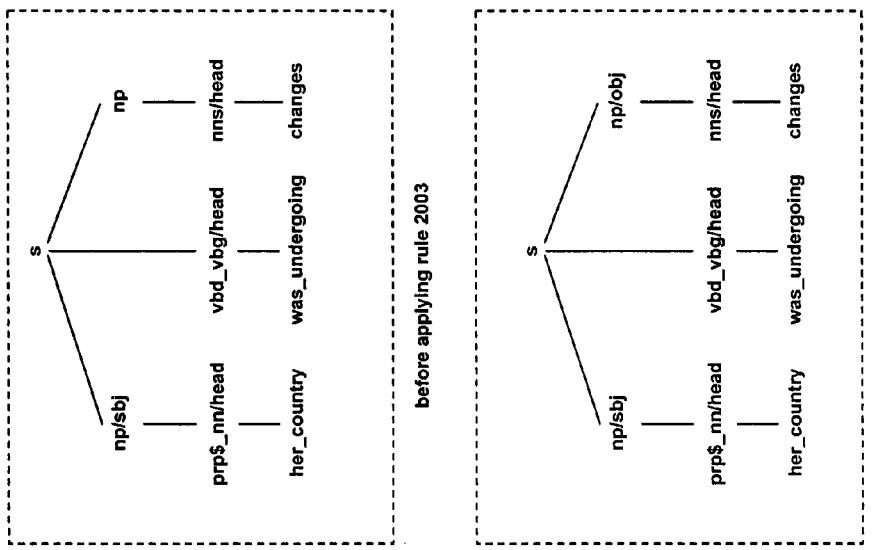
Figure 21:
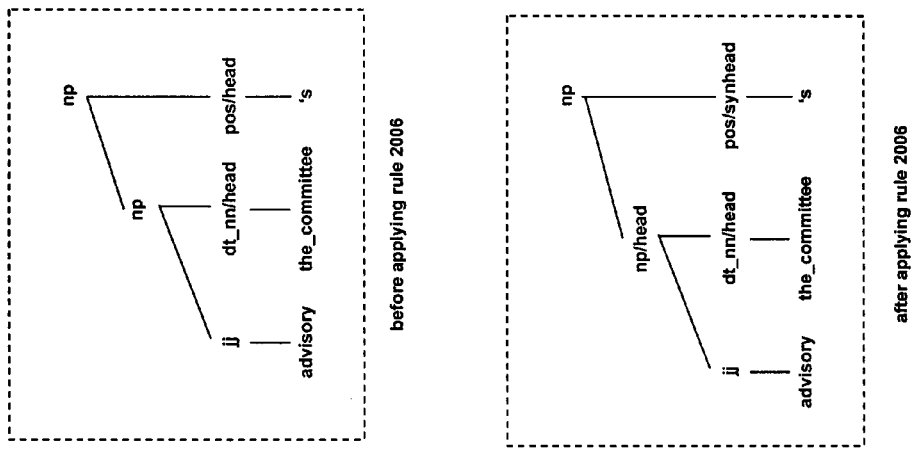
Figure 20:
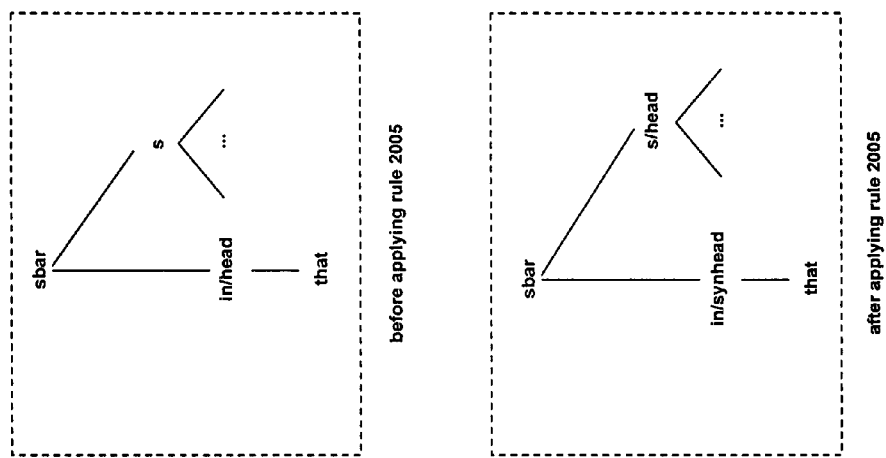
Figure 23:
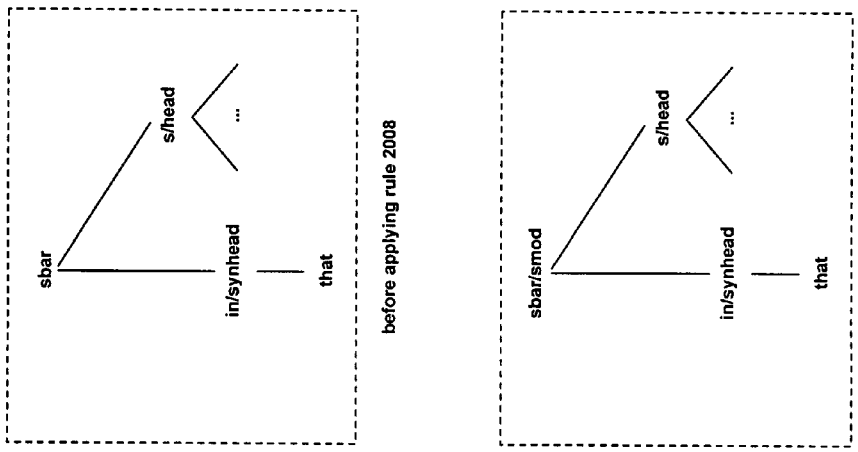
Figure 22:
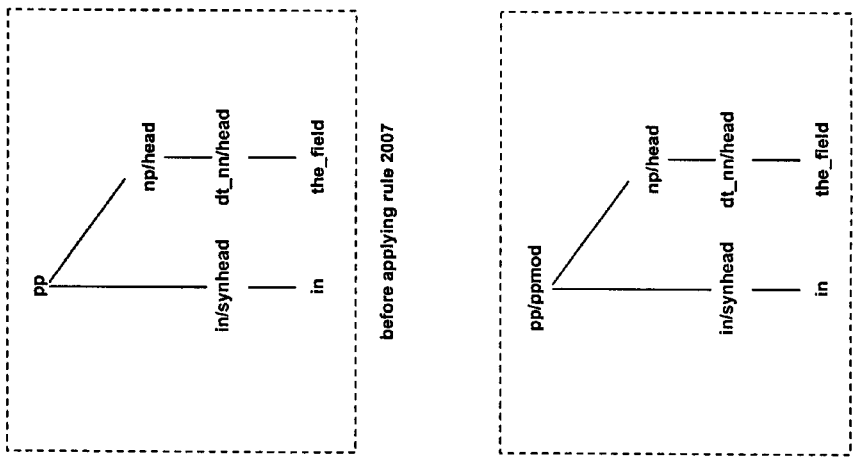
Figure 26:
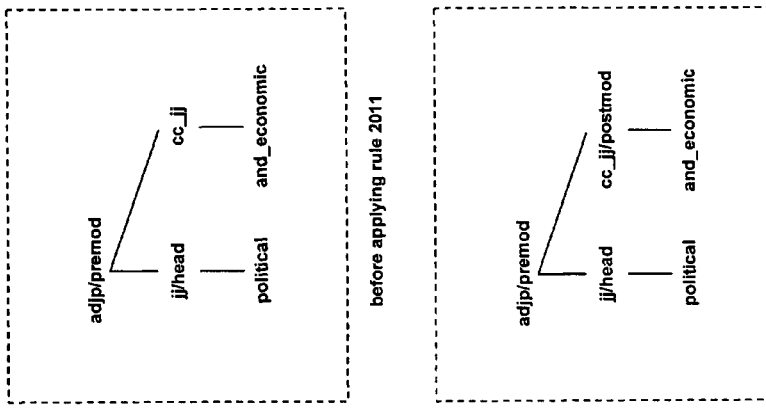
Figure 25:
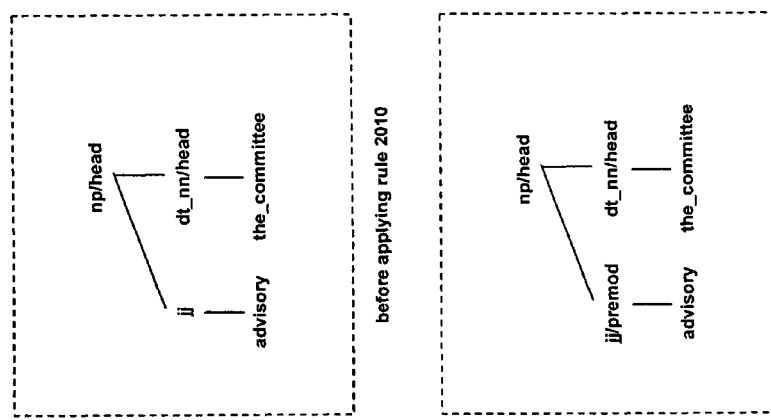

FIGS. 5 through 14 illustrate the operation of each rule by example. The overall operation of the tree transformer is illustrated in FIGS. 4 and 15. For example, given the parse tree shown in FIG. 4, the tree transformer 126 produces several alternative output trees, one of which is shown in FIG. 15.

Referring back to FIG. 3, a role labeler 128 receives a list of transformed trees from the tree transformer 126. The role labeler assigns a linguistic role (e.g. SBJ, OBJ) to each constituent in each received tree. Examples of linguistic roles used in the prototype system are given in Table 4.

TABLE 4

| Role Label | Description |
| --- | --- |
| HEAD | Semantic head word of a phrase or clause |
| SBJ | Subject of a sentence |
| OBJ | Object of a sentence |
| SYNHEAD | Syntactic head of a phrase or clause. Used only when the syntactic head is different than the semantic head, e.g. in a prepositional phrase. |
| PPMOD | Prepositional phrase modifier |
| SMOD | Sentential modifier, e.g. a relative clause. |
| PREMOD | Any node occurring before the head not covered by one of the above labels. |
| POSTMOD | Any node occurring after the head not covered by one of the above labels. |
| MIDMOD | A node that occurs in a sentence or clause between the first auxiliary and the head node, e.g. an adverb. |

Figure 27:
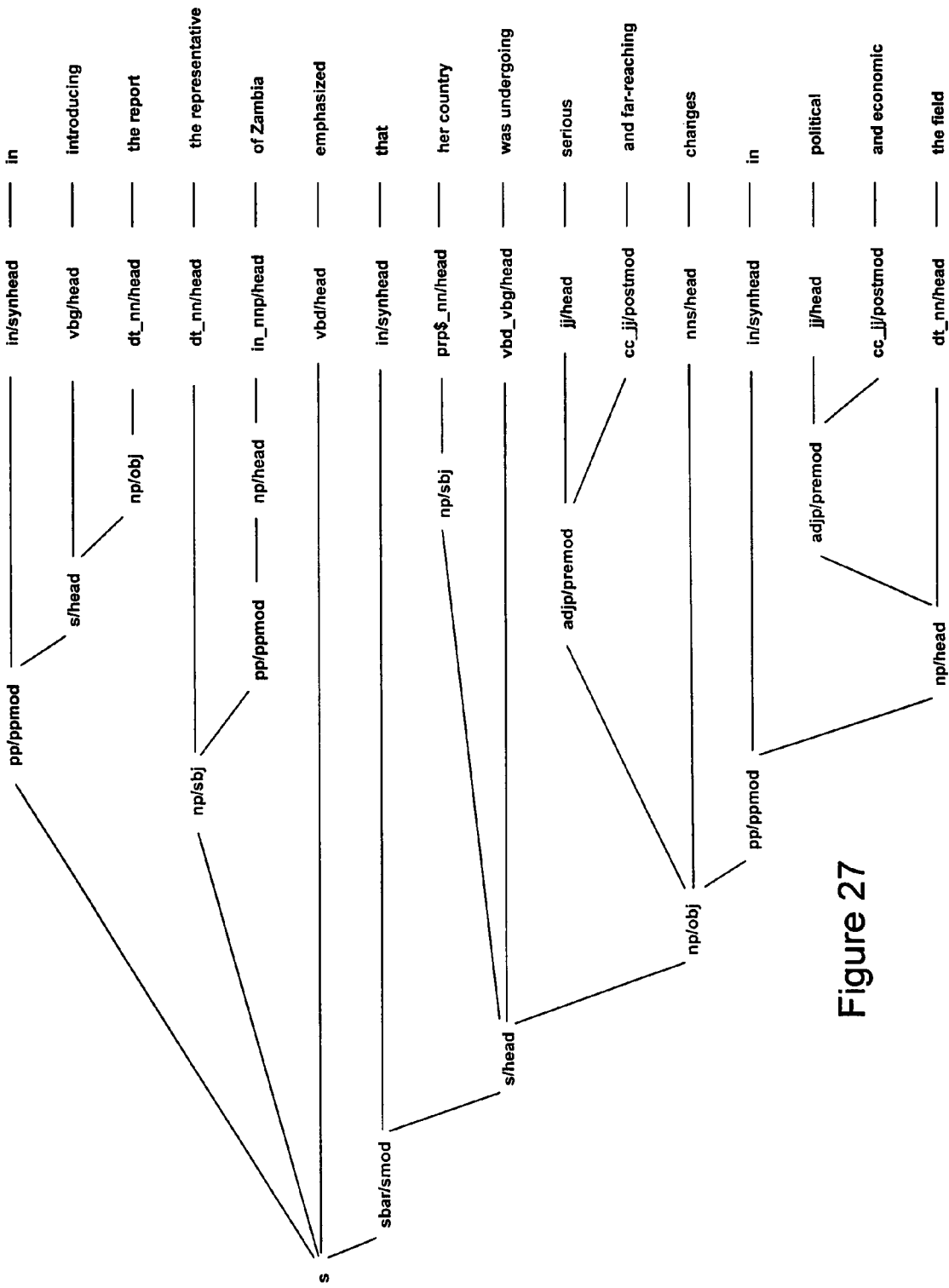
FIG. 27 is an example of a role-labeled tree generated by the role-labeler of FIGS. 16 to 26.

FIGS. 15 and 27 provide an example of the operation of the role labeler. Given the transformed tree shown in FIG. 15 as input, the role labeler 128 produces the tree shown in FIG. 27 as output.

Operation of the role labeler 128 begins by noting the head constituent as determined (predicted) by the destination language parser 124. (LPCFG parsers such as Collins 97 are head-centric and implicitly identify a head for each constituent. Here, the term head is used in the standard linguistic sense, intuitively the most important word of a phrase or clause. One skilled in the art will recognize in view of this disclosure, that this head information can be retained simply by augmenting the parse tree to make reference thereto, or by storing it in an auxiliary data structure.) A set of rules is then applied by role labeler 128 to determine the linguistic role of each constituent. The following Table 5 lists an exemplary set of 11 rules used in the prototype Arabic-to-English system.

TABLE 5

| Rule # | Applies to category | Rule |
| --- | --- | --- |
| 2001 | all | Assign the role HEAD to all nodes predicted as heads by the parser. |
| 2002 | S | Find the rightmost non-temporal* NP preceding the head (if any). Label it with role SBJ. |
| 2003 | S | Find the leftmost non-temporal NP following the head (if any). Label it with role OBJ. |
| 2004 | PP | If the PP contains a preposition followed by an NP or S, label the preposition as SYNHEAD and the NP/S as HEAD (overrides rule 2001). |
| 2005 | SBAR | If the SBAR contains a complementizer followed by an S, label the complementizer as SYNHEAD and the S as HEAD (overrides rule 2001). |
| 2006 | NP | If the NP is possessive, label the 's (or ') as SYNHEAD and the preceding NP as HEAD (overrides rule 2001). |
| 2007 | all | Assign role PPMOD to all PPs. |
| 2008 | all | Assign role SMOD to all SBARs. |
| 2009 | S | For any nodes occurring between the first auxiliary and the head verb (in the untransformed parse) and not covered by one of the above rules, assign the role MIDMOD |
| 2010 | all | For any nodes preceding the head node and not covered by one of the above rules, assign role PREMOD |

TABLE 5-continued

| Rule # | Applies to category | Rule |
| --- | --- | --- |
| 2011 | all | For any nodes following the head node and not covered by one of the above rules, assign role POSTMOD |

*Temporal NPs are those headed by temporal words (e.g. Monday, morning, yesterday, week, etc.)

FIGS. 16 through 26 illustrate the operation of each rule by example.

A type-a productions extractor 130 receives a list of role-labeled trees from the role labeler 128. Such lists are potentially large. For example, for a single input sentence, the destination language parser 124 may produce a list of 50 plausible parse trees. If the tree transformer 126 then produced an average of 10 transformed trees for each possible parse, the type-a productions extractor 130 would receive a list of 500 role-labeled trees.

The purpose of the type-a productions extractor 130 is to extract the non-terminal productions from each of the role-labeled trees associated with a particular sentence of parallel corpus 102, and to construct a single set of productions by taking the union of productions from this entire list of received trees. This set of productions defines a compact grammar that can generate the entire list of received trees. (Since most productions are shared among multiple trees in the n-best list, the number of productions increases far less rapidly than the number of trees.) FIG. 28 shows an exemplary data structure used to represent the productions. (These productions are referred to as 'type-a productions' to distinguish them from other types of productions that will be discussed hereinbelow.)

Figure 29:
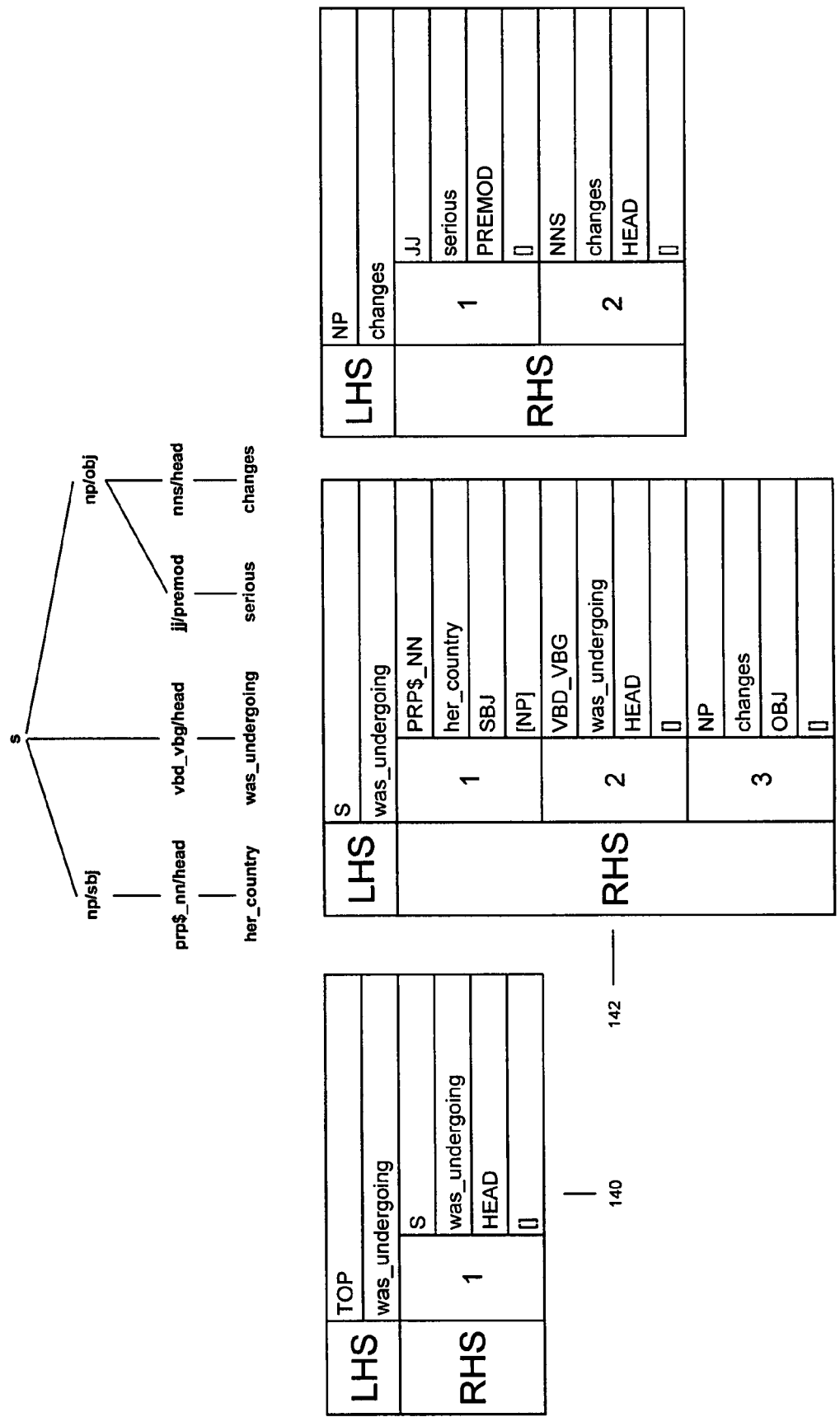
FIG. 29 is an example of a type-a production extractor of the present invention.

These type-a productions are lexicalized, just as in an LPCFG as described hereinabove. Furthermore, unit productions, i.e. productions where the right-hand-side (RHS) contains only a single element, are folded into their parent's production. Specifically, each RHS element contains a path that lists the intermediate nodes between the parent node and the next branching or pre-terminal node. (The nodes below the topmost node of a path can have only one possible role: HEAD. Therefore there is no need to explicitly represent role information for elements of paths.) Therefore, except for top productions, (top productions have an LHS category of TOP and a single RHS element that is the topmost node in a tree) there are no type-a unit productions. FIG. 29 shows an example tree and the set of type-a productions extracted from it. Note the unit production path in element 1 of production 142. One skilled in the art will recognize that the type-a productions can be extracted from a parse tree in the same way that productions of standard context-free grammar can be extracted from any typical parse tree.

Referring back to FIG. 3, a translingual grammar estimator 132 receives sets of type-a productions (168, FIG. 31) from the type-a productions extractor 130, each set being derived from a single destination language sentence, i.e., from parallel corpus 102. Additionally, the translingual grammar estimator 132 receives a source language translation (170, FIG. 31) of each destination language sentence from the parallel corpus 102 as shown. From these two input sources, the translingual grammar estimator 132 generates a translingual parsing model 108. The model 108 thus includes parameters sufficient to rank candidate parses, the parameters relating elements of the candidate parses including source language words, destination language words, syntactic labels, and role labels.

As mentioned hereinabove, the translingual grammar estimator 132 may optionally receive a large destination language corpus 116 to further refine the translingual parsing model 108. An example of estimator 132 is discussed in detail hereinbelow.

Operation of translingual grammar estimator 132, e.g., to produce the translingual grammar, is treated as a constrained grammar induction exercise. Specifically, estimator 132 is configured to induce a LPCFG grammar (referred to herein as a type-b grammar) that is capable of generating the source language training sentences, subject to sets of constraints that are derived from their destination language counterparts. This grammar induction may be effected using the well-known inside-outside algorithm described by Baker, 79, ("Trainable grammars for speech recognition," Proceedings of the Spring Conference of the Acoustical Society of America, pages 547-550").

In particular embodiments, specific constraints imposed on the induced type-b grammar include:

- If a received type-a production contains modifiers $m_1$, $m_2, \ldots, m_n$ that are attached to head h with roles $r_1$, $r_2, \ldots, r_n$ respectively, then the induced grammar permits the same set of attachments using the same roles, but does not require that the modifiers be attached in the same order as in the type-a production. Instead, any ordering of the modifiers is permitted.
- For any particular derivation in the induced grammar, a bounded number of attachments are permitted that occur in none of the received type-a productions. That is, a modifier m may attach to head h, even if there is no type-a production in which m attaches to h. In such cases, the role assigned to the attachment is "inserted". Such attachments facilitate grammar induction in cases where mismatches occur between source and destination language dependencies. To keep the estimation procedure tractable, only one such inserted attachment per tree is currently permitted, although more may be provided in some embodiments.
- Not all modifiers occurring in a received type-a production are required to be present by the induced grammar; some may be omitted. For example, in a particular type-a production, modifiers $m_1$, $m_2$, and $m_3$ may be attached to head h, but the constrained grammar would permit a constituent in which only $m_2$ and $m_3$ are attached to head h.
- Each modifier is permitted to attach only once within a constituent. For example, the modifier (NP, the_representative) with role SBJ would be permitted to attach only once to head (S, emphasized).

Figure 31:
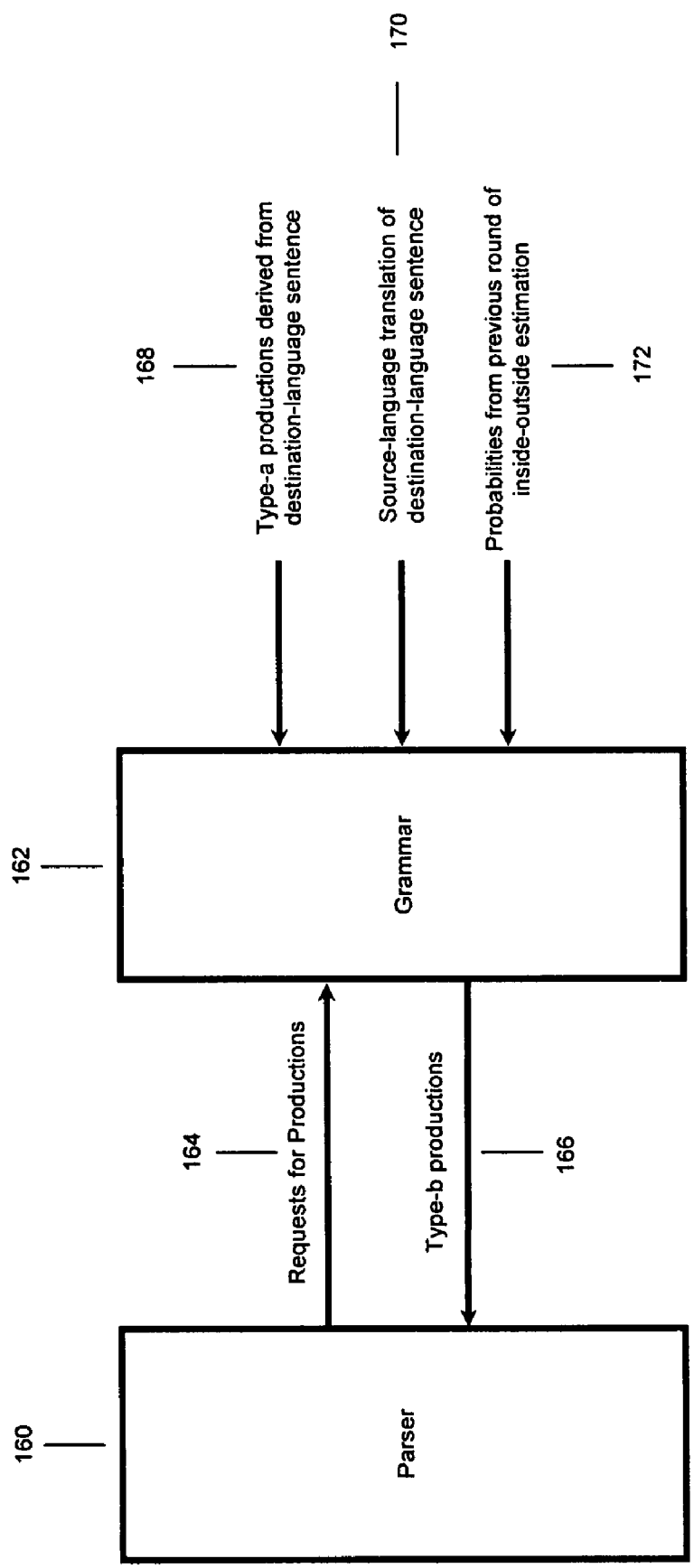
FIG. 31 is a more detailed functional block diagram of an exemplary translingual grammar estimator of the present invention.

To enforce the foregoing constraints, an architecture for grammar estimator 132 may be used, which includes a parser 160 that is decoupled from the type-b grammar 162 as shown in FIG. 31. Formally, in particular embodiments, the type-b grammar 162 is a 4-tuple consisting of 1) a set of variables, 2) a set of terminals, 3) a set of probabilistic productions, and 4) a unique TOP variable. To distinguish this from other types of grammars used in the system, this is referred to it as a type-b grammar, and its components as type-b variables, type-b terminals, and type-b productions.

Type-b variables are not simple symbols such as may be expected in a conventional grammar, but rather, are composite objects that additionally maintain state information. This state information is used to enforce various types of constraints. For example, each type-b variable contains a "complement" field that tracks the remaining modifiers not yet attached to a constituent, thereby permitting enforcement of the constraint that each modifier can attach only once. A brief explanation of the data fields used in type-b variables is given in the following Table 6.

TABLE 6

| Field | Description |
| --- | --- |
| Category | A nonterminal symbol such as S, VP, NP, etc. |
| Head word | The head word of this constituent (as in a LPCFG). |
| Complement set | Parser state information: the remaining elements of the type-a production not yet expressed. |
| Left edge | Parser state information: the leftmost modifier attached to the constituent so far. Form is (category, role). |
| Right edge | Parser state information: the rightmost modifier attached to the constituent so far. Form is (category, role). |
| A_production | Parser state information: the type-a production from which this constituent derives |
| Missing constituent | Parser state information: used to account for differences in dependencies between source and destination languages. The form is (category, head word). A missing constituent is one that the type-a production predicts should be attached, but has been omitted. |
| Inserted constituent | Parser state information: used to account for differences in dependencies between source and destination languages. The form is (category, head word). An inserted constituent is one that has been attached although it is not predicted by the type-a production. |
| Total mismatches | Parser state information: total count of mismatched attachments occurring anywhere in the parse. Maximum is 1 in the prototype system. |

Type-b terminals are contiguous sequences of one or more source language words (in the prototype system, terminals may be up to three words in length). By permitting terminals that are sequences of more than one word, a single destination language term can be aligned to multiple source language words.

Type-b productions, as shown in FIG. 30, are of three types: top productions (tp-productions), binary-branching productions (br-productions), and leaf productions (lf-productions). During grammar estimation (at estimator 132, FIG. 3), the parser 160 requests productions (at 164) from the grammar 162 and receives a (possibly empty) list of type-b productions (at 166) that satisfy the request in return. An unusual characteristic of the grammar 162 is that its elements are created "on the fly" as needed to satisfy requests from the parser. Thus, the grammar 162 can verify that all constraints are satisfied before returning its response, and can dynamically create variables that reflect the current state of the derivation.

In these embodiments, for each request, the parser 160 passes a RHS (right hand side) to the grammar 162 and receives a list of productions 166 that have the specified RHS in return. This arrangement supports various bottom-up parsing strategies, such as the well-known CKY algorithm as well as the inside-outside algorithm. Three types of requests are supported:

Request_top_productions (B_Variable vr)—returns a top production (if any exists) where TOP->vr.

Request_branching_productions (B_Variable vr1, B_Variable vr2)—returns a list of branching productions (if any) where vr1 attaches to vr2 or where vr2 attaches to vr1.

Request_leaf_productions (B_Terminal tr)—returns a list of leaf productions that produce the source language word(s) tr.

Appendix A gives illustrative pseudo-code describing the implementation of each of these request types.

In particular embodiments, translingual grammar estimator 132 operates in three phases. During phase 1, the inside-outside algorithm is used to estimate an approximate probability model for LF_Productions only (i.e. the translation probabilities for words). These approximate probabilities allow for greater pruning during the subsequent estimation phases. If desired, the probabilities for LF_Productions may be initialized prior to phase 1 with estimates taken from a finite-state model, such as Model 1 described by Brown et al., 1995. Such initialization tends to help speed convergence. During phase 2, the inside-outside algorithm is used to determine probabilities for all three b_production types: TP_Productions, BR_Productions, as well as LF_Productions. (In some embodiments, phase 2 may be omitted entirely at a cost of some potential degradation in model accuracy.) For both phase 1 and phase 2, several iterations of inside-outside estimation (172, FIG. 31) are typically used (e.g., at least 2 or 3). During phase 3, a conventional probabilistic CKY parsing algorithm may be used—optionally with model parameters from phase 2—to extract the single highest-scoring parse for each sentence. The result is a treebank of translingual parse trees such as shown in FIG. 2. From this treebank, frequencies are extracted for computing the probabilities of the translingual parsing model 108. (In principle, it is not strictly necessary to construct a treebank of 1-best parses prior to extracting the frequencies; it is possible to extract the frequencies directly from the final inside-outside pass of phase 2. However, constructing a 1-best treebank tends to substantially reduce the size of the final model.) Specific examples of these three phases are now described.

Phase-1 Probability Model

In representative embodiments, branching probabilities for standard attachments are fixed at 1.0 and thus have no effect in this phase. Branching probabilities for mismatched dependencies are set to a fixed penalty (e.g. 0.05). Top probabilities are also fixed at 1.0. Only the LF_Production probabilities are updated during this phase. A unigram probability model is used for these probabilities.

Phase-2 Probability Model

In this phase, branching and top probabilities are also updated. Branching productions are factored into three parts: 1) head prediction, 2) modifier prediction, and 3) modifier headword prediction. The following formulas refer to variable prev_category and prev_role. For productions that extend a partially-constructed constituent, prev_category and prev_role are taken from either the left_edge or right_edge of the head variable, depending on branching direction. For productions that start a new constituent, prev_category and prev_role are both nil.

Phase-3 Probability Model

During phase 3, a translingual treebank is constructed and the translingual parsing model 108 is produced. This model has two parts.

The first part is a model that generates one or more source language words, given a destination language term and its category (i.e., syntactic label). The probabilities for this model may be identical to those for LF_Production above.

The second part is a LPCFG similar to Model 1 described in Collins, 97, except that:

Path and role are predicted simultaneously, together with syntactic category and label.

The distance feature is eliminated.

1st order Markov features are added—previous_category and previous_role

For, completeness, the details of the model are described below.

Head Prediction:

$$P(hc, hp | pc, pt, pw)$$

where
- hc is the head category
- hp is the head path
- pc is the parent category
- pt is the parent part-of-speech tag
- pw is the parent word Modifier Prediction:

$$P(mc, mt, mw, mp, mr | pc, pt, pw, hc, pm)$$

where
- mc is the modifier category
- mt is the modifier tag
- mw is the modifier word
- mp is the modifier path
- mr is the modifier role
- pc, pt, pw, and hc are as above in the head prediction case
- pm is the syntactic category of the previous modifier (next closest to head)

Modifier prediction is then factored into two parts: 1) prediction of category, tag, path, and role, and 2) prediction of headword.

As a practical matter, all probabilities in this model should be smoothed. Smoothing techniques are well-known in the literature, for example, see Collins, 97.

Optionally Improving the Model with Statistics from a Large Destination Language Corpus As mentioned hereinabove, statistics derived from a large destination language corpus can be added straightforwardly to the model described above. Since modifier prediction is factored into two parts and the part predicting headwords is not dependent on the previous modifier, statistics for modifier-headword prediction are insensitive to modifier order. Therefore, there is no problem incorporating headword statistics from trees where the modifier order is different. In particular, there is no barrier to incorporating modifier-headword statistics from destination language parse trees.

As shown in FIG. 3, a large destination language corpus 116—if provided—is parsed by destination language parser 124. In particular embodiments, only the 1-best parse is used for each sentence. Next, the tree transformer 126, as described hereinabove, transforms each tree into a form that is closer to the source language. If the rules lead to multiple trees for each parse, then all resulting trees may be used. The role labeler 128 adds role labels to the transformed trees, again as described earlier. Finally, a lexical counts extractor 136 extracts bi-lexical statistics which are similar to the statistics generated by translingual grammar estimator 132 as discussed hereinabove. These statistics are then appended to the (e.g., bi-lexical) statistics extracted from the translingual treebank by estimator 132 produced during phase 3 above. The combined statistics are then used to compute the (bi-lexical) probabilities in the translingual parsing model 108.

Runtime Translation Program 106

Turning to FIG. 32, once a translingual parsing model 108 has been estimated, translation requires little more than LPCFG parsing. As shown, source language sentences 100 arrive at the translingual parser 180. The translingual parser also receives the translingual parsing model 108 as described hereinabove. Before parsing proceeds, the parser's chart is seeded with the possible translations of each contiguous group of one or more source language words, where the possible translations and their probabilities are given by the LF_Productions described above. (Up to 3 words may be used in the exemplary/prototype system.) Thus, the chart is seeded with 1) destination language words, 2) their syntactic and role labels, and 3) the probabilities of those word/label pairs producing the source language words. At this point, parsing proceeds just as for the monolingual case, except that the resulting tree contains role information for each node.

A tree reorderer 182 uses that role information to rearrange the tree into a natural word order for the destination language. However, the tree reorderer 182 first applies inverse rules to undo the morphological changes made by the tree transformer 126 (e.g. to separate out determiners from head nouns, break up verb groups into individual words, etc.). Once the morphological changes have been undone, tree rearrangement proceeds. In the prototype system, where the destination language is English, the rearrangement rules are as follows:

SBJ nodes immediately precede the head verb

OBJ nodes immediately follow the head verb

POSTMOD nodes follow the head node, after the OBJ if present

PPMOD nodes follow the head node, after POSTMODs if any

SMOD nodes follow the head node, after PPMODs if any

MIDMOD nodes are placed after the first verb of the verb group

PREMOD nodes are placed before the head node, preceding the SBJ if present. The order of any PREMOD nodes that occur post-head in the translingual parse tree is reversed before moving them to the pre-head position.

SYNHEAD nodes precede the head node, prior to PREMODs if any

Determiners and possessive pronouns are placed at the front of noun phrases

Prepositions are moved to the front of prepositional phrases

Once a source language sentence has been parsed and reordered, the translation process is essentially complete. If a conventional translation is required, an extract pre-terminals process 184 extracts the pre-terminal nodes, yielding the translated sentence. Alternatively, if a destination language parse tree is required, a remove leaves process 186 removes the source language terminals, leaving the destination language parse.

It should be understood that any of the features described with respect to one of the embodiments described herein may be used with any other of the embodiments described herein without departing from the spirit and scope of the present invention.

It should further be understood that although the foregoing embodiments have been described as software elements running on a computer or other smart device, nominally any of the various modules or processes described herein may be implemented in software, hardware, or any combination thereof, without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

APPENDIX A

```
request_top_productions(B_Variable vr)
  // returns a list of TP_Productions where rhs matches vr
{
  // return nothing if vr is incomplete or if a mismatched
  // dependency is still unresolved
  if (vr.complement_set ≠ [ ]) or (vr.missing_constituent ≠ NIL) or
    (vr.inserted_constituent ≠ NIL)
  {
    return empty list
  }
  let result = empty list of TP_Productions
  let aprods = all A_Productions for this sentence where the lhs category
               is TOP and vr satisfies the rhs (i.e. vr's category and
               headword match those specified in the A_Productions
               rhs)
  forall ap in aprods {
    // add a TP_Production to the result that corresponds to ap
    // first create the lhs for the new production
    let vl = new B_Variable
    vl.category = TOP
    vl.headword = vr.headword
    vl.complement_set = [ ]
    vl.left_edge = NIL
    vl.right_edge = NIL
    vl.a_production = ap
    vl.missing_constituent = NIL
    vl.inserted_constituent = NIL
    vl. total_mismatches = 0;
    // now add the new production
    let tp = new TP_Production
    tp.lhs = vl
    tp.rhs.variable = vr
    tp.rhs.path = ap[1].path
    tp.rhs.role = ap[1].role;
    tp.probability = compute_prob(tp)
    append tp to result
  }
  return result
}
request_branching_productions(B_Variable vr1, B_Variable vr2)
  // returns a list of BR_Productions where the rhs is (vr1 vr2)
{
  // check if constraint on mismatched dependencies is violated
  if ((vr1.total_mismatches + vr2.total_mismatches) == 2) {
    // possible violation, check some more
    if ((vr1.missing_constituent) == (vr2.inserted_constituent)) OR
       (vr2.missing_constituent) == (vr1.inserted_constituent))
    {
      // ok, two mismatches but they're the same and cancel out
      let missing = NIL // nothing missing since cancelled out
      let inserted = NIL // likewise, nothing inserted
      let mismatches = 1 // really only one since the same
    } else {
      // quit, can't have more than one mismatch
      return empty list
    }
  } else {
    // no violation, determine number of mismatches so far
    let mismatches = vr1.total_mismatches + vr2.total_mismatches
    let missing = any missing constituent in vr1 or vr2, NIL otherwise
    let inserted = any inserted constituent in vr1 or vr2, NIL otherwise
  }
  // check if vr1 and vr2 are both complete constituents
  if (vr1.complement_set == [ ]) and (vr2.complement_set == [ ]) {
    // start new constituents where vr1 is head and vr2 is modifier
    let aprods1 = all A_Productions for this sentence where the head role
                  is satisfied by vr1 and where vr2 satisfies a modifier role
    forall ap in aprods1 {
      // add a BR_Production to the result that corresponds to ap
      let head_idx = index of ap's rhs that vr1 satisfies as the head
      let mod_idx = index of ap's rhs that vr2 satisfies as a modifier
      // first create the lhs for the new production
      let vl = new B_Variable
      vl.category = ap.lhs.category
      vl.headword = ap.lhs.headword
      vl.complement_set = ap.rhs – ap.rhs[mod_idx]
      vl.left_edge = NIL
      vl.right_edge = {vr2.category, ap[mod_idx].role}
      vl.a_production = ap
```

APPENDIX A-continued

```
        vl.missing_constituent = missing
        vl.inserted_constituent = inserted
        vl.total_mismatches = mismatches
        // now add the new production
        let br = new BR_Production
        br.lhs = vl
        br.rhs.left_variable = vr1
        br.rhs.left_path = ap[head_idx].path
        br.rhs.left_role = ap[head_idx].role
        br.rhs.right_variable = vr2
        br.rhs.right_path = ap[mod_idx].path
        br.rhs.right_role = ap[mod_idx].role
        br.probability = compute_prob(br)
        append br to result
    }
    // start new constituents where vr2 is head and vr1 is modifier
    let aprods2 = all A_Productions for this sentence where the head role
            is satisfied by vr2 and where vr1 satisfies a modifier role
    forall ap in aprods2 {
        // add a BR_Production to the result that corresponds to ap
        let head_idx = index of ap's rhs that vr2 satisfies as the head
        let mod_idx = index of ap's rhs that vr1 satisfies as a modifier
        // first create the lhs for the new production
        let vl = new B_Variable
        vl.category = ap.lhs.category
        vl.headword = ap.lhs.headword
        vl.complement_set = ap.rhs - ap.rhs[mod_idx]
        vl.left_edge = {vr1.category, ap[mod_idx].role}
        vl.right_edge = NIL
        vl.a_production = ap
        vl.missing_constituent = missing
        vl.inserted_constituent = inserted
        vl.total_mismatches = mismatches
        // now add the new production
        let br = new BR_Production
        br.lhs = vl
        br.rhs.left_variable = vr1
        br.rhs.left_path = ap[mod_idx].path
        br.rhs.left_role = ap[mod_idx].role
        br.rhs.right_variable = vr2
        br.rhs.right_path = ap[head_idx].path
        br.rhs.right_role = ap[head_idx].role
        br.probability = compute_prob(br)
        append br to result
    }
}
// check if vr1 is partially constructed and vr2 is complete
if (vr1.complement_set ≠ [ ]) and (vr2.complement_set == [ ]) {
    // attempt to extend vr1 constituent by attaching vr2
    if (an element of vr1's complement_set is satisfied by vr2) {
        let idx = index into vr1's complement_set of element satisfied vr2
        // add a BR_Production where vr2 extends vr1
        // first create the lhs for the new production
        let vl = copy of vr1
        vl.complement_set = vr1.complement_set -
            vr1.complement_set[idx]
        vl.right_edge = {vr2.category, vr1.complement_set[idx].role}
        // now add the new production
        let br = new BR_Production
        br.lhs = vl
        br.rhs.left_variable = vr1
        br.rhs.left_path = NIL
        br.rhs.left_role = HEAD
        br.rhs.right_variable = vr2
        br.rhs.right_path = vr1.complement_set[idx].path
        br.rhs.right_role = vr1.complement_set[idx].role
        br.probability = compute_prob(br)
        append br to result
    }
}
// check if vr2 is partially constructed and vr1 is complete
if (vr2.complement_set ≠ [ ]) and (vr1.complement_set == [ ]) {
    // attempt to extend vr2 constituent by attaching vr1
    if (an element of vr2's complement_set is satisfied by vr1) {
        let idx = index into vr2's complement_set of element satisfied vr1
        // add a BR_Production where vr1 extends vr2
        // first create the lhs for the new production
        let vl = copy of vr2
        vl.complement_set = vr2.complement_set -
            vr2.complement_set[idx]
        vl.left_edge = {vr1.category, vr2.complement_set[idx].role}
        // now add the new production
        let br = new BR_Production
        br.lhs = vl
        br.rhs.left_variable = vr1
        br.rhs.left_path = vr2.complement_set[idx].path
        br.rhs.left_role = vr2.complement_set[idx].role
        br.rhs.right_variable = vr2
        br.rhs.right_path = NIL
        br.rhs.right_role = HEAD
        br.probability = compute_prob(br)
        append br to result
    }
}
// now create complete versions of partially complete constituents. That
// is, create complete versions where one or more elements from the
// original A_Production are missing
let incs = all productions from result list where complement_set ≠ [ ]
forall br1 in incs {
    let br2 = copy of br1
    let vl2 = copy of br1.lhs
    // update probability score with deletion penalties
    br2.probability = br1.probability *
        completion_score(vl2.complement_set)
    vl2.complement_set = [ ]
    br2.lhs = vl2
    append br2 to result
}
// now attach mismatched constituents
if (mismatched_attachments_permitted) {
    // attempt to extend vr1 by attaching vr2
    // make sure not attaching to a part-of-speech tag
    if (vr1.category is not a part-of-speech tag) { // e.g. as nn or dt_nn
        // make sure vr2 is a completed constituent
        if (vr2.complement_set == [ ]) {
            // make sure no more than 1 mismatched dependency
            if ((vr1.total_mismatches + vr2.total_mismatches) == 0) OR
               (vr1.missing_constituent is satisfied by vr2) // vr1 is missing
               vr2
            {
                // finally, make sure this really is a mismatched attachment
                if (NOT (vr2 satisfies some role in vr1.a_production.rhs)) {
                    let vl = copy of vr1
                    if (vr1.missing_constituent == NIL) {
                        set vl.inserted_constituent with fields from vr2
                    } else {
                        vl.missing_constituent = NIL
                    }
                    vl.total_mismatches = 1
                    vl.right_edge = {vr2.category, INSERTED}
                    // now add the new production
                    let br = new BR_Production
                    br.lhs = vl
                    br.rhs.left_variable = vr1
                    br.rhs.left_path = NIL
                    br.rhs.left_role = HEAD
                    br.rhs.right_variable = vr2
                    br.rhs.right_path = NIL
                    br.rhs.right_role = INSERTED
                    br.probability = compute_prob(br)
                    append br to result
                }
            }
        }
    }
}
// attempt to extend vr2 by attaching vr1
// make sure not attaching to a part-of-speech tag
if (vr2.category is not a part-of-speech tag) { // e.g. as nn or dt_nn
    // make sure vr1 is a completed constituent
    if (vr2.complement_set == [ ]) {
        // make sure no more than 1 mismatched dependency
        if ((vr1.total_mismatches + vr2.total_mismatches) == 0) OR
           (vr2.missing_constituent is satisfied by vr1) // vr2 is missing vr1
        {
            // finally, make sure this really is a mismatched attachment
            if (NOT (vr1 satisfies some role in vr2.a_production.rhs)) {
                let vl = copy of vr2
```

APPENDIX A-continued

```
            if (vr2.missing_constituent == NIL) {
                set vl.inserted_constituent with fields from vr1
            } else {
                vl.missing_constituent = NIL
            }
            vl.total_mismatches = 1
            vl.left_edge = {vr1.category, INSERTED}
            // now add the new production
            let br = new BR_Production
            br.lhs = vl
            br.rhs.left_variable = vr1
            br.rhs.left_path = NIL
            br.rhs.left_role = INSERTED
            br.rhs.right_variable = vr2
            br.rhs.right_path = NIL
            br.rhs.right_role = HEAD
            br.probability = compute_prob(br)
            append br to result
          }
        }
      }
    }
// attempt to start new constituents with vr1 as head and vr2 attached
// verify that vr1 and vr2 are both complete constituents
if (vr1.complement_set == [ ]) and (vr2.complement_set == [ ]) {
    // make sure no more than 1 mismatched dependency
    if ((vr1.total_mismatches + vr2.total_mismatches) == 0) OR
       (vr1.missing_constituent is satisfied by vr2) // vr1 is missing vr2
    {
        let aprods3 = all A_Productions for this sentence where the head
                    role is satisfied by vr1 and where vr2 satisfies NO
                    modifier role
        forall ap in aprods3 {
            // add a BR_Production to the result that corresponds to ap
            let head_idx = index of ap's rhs that vr1 satisfies as the head
            // first create the lhs for the new production
            let vl = new B_Variable
            vl.category = ap.lhs.category
            vl.headword = ap.lhs.headword
            vl.complement_set = ap.rhs
            vl.left_edge = NIL
            vl.right_edge = {vr2.category, INSERTED}
            vl.a_production = ap
            if (vr1.missing_constituent == NIL) {
                set vl.inserted_constituent with fields from vr2
            } else {
                vl.inserted_constituent = NIL
            }
            vl.missing_constituent = NIL
            vl.total_mismatches = 1
            // now add the new production
            let br = new BR_Production
            br.lhs = vl
            br.rhs.left_variable = vr1
            br.rhs.left_path = ap[head_idx].path
            br.rhs.left_role = ap[head_idx].role
            br.rhs.right_variable = vr2
            br.rhs.right_path = NIL
            br.rhs.right_role = INSERTED
            br.probability = compute_prob(br)
            append br to result
          }
        }
      }
    }
// attempt to start new constituents with vr2 as head and vr1 attached
// verify that vr1 and vr2 are both complete constituents
if (vr1.complement_set == [ ]) and (vr2.complement_set == [ ]) {
    // make sure no more than 1 mismatched dependency
    if ((vr1.total_mismatches + vr2.total_mismatches) == 0) OR
       (vr2.missing_constituent is satisfied by vr1) // vr2 is missing vr1
    {
        let aprods4 = all A_Productions for this sentence where the
                    head role is satisfied by vr2 and where vr1
                    satisfies NO modifier role
        forall ap in aprods4 {
            // add a BR_Production to the result that corresponds to ap
            let head_idx = index of ap's rhs that vr2 satisfies as the head
            // first create the lhs for the new production
            let vl = new B_Variable
            vl.category = ap.lhs.category
            vl.headword = ap.lhs.headword
            vl.complement_set = ap.rhs
            vl.left_edge = {vr1.category, INSERTED}
            vl.right_edge = NIL
            vl.a_production = ap
            if (vr1.missing_constituent == NIL) {
                set vl.inserted_constituent with fields from vr1
            } else {
                vl.inserted_constituent = NIL
            }
            vl.missing_constituent = NIL
            vl.total_mismatches = 1
            // now add the new production
            let br = new BR_Production
            br.lhs = vl
            br.rhs.left_variable = vr1
            br.rhs.left_path = NIL
            br.rhs.left_role = INSERTED
            br.rhs.right_variable = vr2
            br.rhs.right_path = ap[head_idx].path
            br.rhs.right_role = ap[head_idx].role
            br.probability = compute_prob(br)
            append br to result
          }
        }
      }
    }
    return result
}
request_leaf_productions(B_Terminal tr)
// returns a list of LF_Productions where the rhs is tr
{
    let atags = the list of all part of speech tags from the A_Productions for
              this sentence // both simple, like nn, and compound,
              like dt_nn
    forall tag in atags {
        let vl = new B_Variable
        vl.category = tag
        vl.headword = vr.headword
        vl.complement_set = [ ]
        vl.left_edge = NIL
        vl.right_edge = NIL
        vl.a_production = NIL
        vl.missing_constituent = NIL
        vl.inserted_constituent = NIL
        vl. total_mismatches = 0;
        // now add the new production
        let lf = new LF_Production
        lf.lhs = vl
        lf.rhs = tr
        tp.probability = compute_prob(tp)
        append lf to result
      }
}
```

Having thus described the invention, what is claimed is:

1. A method for machine translation from a source language to a destination language, said method comprising:
   (a) receiving, at a translation module, at least one sentence in the source language;
   (b) producing, using a computer, destination language translations of the at least one sentence, including destination language words corresponding to words of the source language sentence, independently of any need for a source language treebank;
   (c) assigning syntactic labels, using a computer, indicating a syntactic category, to the destination language words;
   (d) searching among and statistically ranking, with a translingual parsing model, a plurality of candidate parses of the destination language words, each candidate parse having:
   elements labeled with destination language words corresponding to words of the source language sentence;

syntactic labels indicating a syntactic category of the elements; and role labels indicating relationships between the elements;

(e) selecting a statistically high ranked parse for the at least one sentence; and (f) rearranging the parse using the syntactic and role labels, in accordance with word order conventions of the destination language to generate a translingual parse of the source language sentence.

2. The method of claim 1, wherein said rearranging (f) comprises using a rule set associated with the word order conventions.

3. The method of claim 1, wherein the translingual parse comprises a plurality of nodes disposed in downstream branching relation from a single top node to a plurality of terminal nodes.

4. The method of claim 3, wherein said plurality of nodes comprises:

a plurality of labeled nodes including the syntactic labels and the role labels;

a plurality of pre-terminal nodes coupled downstream of the labeled nodes, the pre-terminal nodes respectively including the destination language words; and the plurality of terminal nodes coupled to the pre-terminal nodes, the terminal nodes respectively including the words of the source language sentence.

5. The method of claim 4, wherein said rearranging (f) comprises placing the pre-terminal nodes into a word order associated with the destination language.

6. The method of claim 5, comprising removing the plurality of terminal nodes from the translingual parse to generate a destination language parse.

7. The method of claim 5, comprising extracting the pre-terminal nodes to generate a destination language translation.

8. The method of claim 3, wherein the syntactic labels are selected from the group consisting of: CC, CD, DT, EX, FW, IN, JJ, JJR, JJS, LS, MD, NN, NNS, NNP, NNPS, PDT, POS, PRP, PP$, RB, RBR, RBS, RP, SYM, TO, UH, VB, VBD, VBG, VBN, VBP, VBZ, WDT, WP, WP$, WRB, #, $, ., ,, :, (, ), ", ', ", ', ", ADJP, ADVP, NP, PP, S, SBAR, SBARQ, SINV, SQ, VP, WHADVP, WHNP, WHPP, X, and combinations thereof.

9. The method of claim 3, wherein the role labels define candidate roles of each labeled node, within the translingual parse, relative to its adjacent upstream node.

10. The method of claim 9, wherein the role labels are selected from the group consisting of: HEAD, SBJ, OBJ, SYNHEAD, PPMOD, SMOD, PREMOD, POSTMOD, MIDMOD, and combinations thereof.

11. The method of claim 1, wherein said searching (d) comprises (g) generating the translingual parsing model.

12. The method of claim 11, wherein said generating (g) comprises:

(h) receiving, at a parser training module, a destination language treebank having parse trees of a plurality of destination language sentences, the parse trees of said destination language sentences having nodes labeled with the syntactic labels;

(i) generating, using the destination language treebank, a destination language parsing model, including parameters for ranking candidate parse trees for a destination language sentence;

(j) receiving, at the parsing module, a second plurality of destination language sentences from a parallel corpus, the parallel corpus including the second plurality of destination language sentences and their respective source language equivalents;

(k) applying the destination language parsing model to the second plurality of destination language sentences to generate a ranked list of candidate parse trees for each sentence of the second plurality of destination language sentences;

(l) transforming the candidate parse trees by applying, with a tree transformer, a rule set associated with linguistic characteristics of the source and destination languages;

(m) assigning, with a role labeler, a linguistic role label to nodes of the candidate parse trees, the role label corresponding to the linguistic role of a node within its respective parse tree;

(n) extracting grammar constraints from portions of each candidate parse tree;

(o) estimating the translingual parsing model using the extracted grammar constraints, and source language sentences of the parallel corpus, the translingual parsing model including parameters sufficient to rank candidate parses, wherein the parameters relate elements of the candidate parses including source language words, destination language words, syntactic labels, and role labels.

13. The method of claim 12, wherein said linguistic characteristics include morphological structure of the source and destination languages.

14. The method of claim 12, wherein said linguistic characteristics include phrase structure of the source and destination languages.

15. The method of claim 12, wherein said estimating (o) is effected using an inside-outside algorithm.

16. The method of claim 12, wherein said estimating (o) is effected using a CKY algorithm.

17. The method of claim 12, wherein said receiving (j) further comprises receiving a destination language corpus.

18. The method of claim 17, wherein said extracting (n) comprises extracting statistics relating to dependencies between elements from the parse trees of the destination language corpus.

19. The method of claim 18, wherein the dependencies comprise lexicalized dependencies.

20. A method for generating a translingual parsing model for machine translating a source language to a destination language, said method comprising:

(a) receiving, at a parser training module, a destination language treebank having parse trees of a plurality of destination language sentences, the parse trees of said destination language sentences having nodes labeled with their syntactic categories in the destination language;

(b) generating, with a computer using the destination language treebank, a destination language parsing model, including parameters for ranking candidate parse trees for a destination language sentence;

(c) receiving, at the parsing module, a second plurality of destination language sentences from a parallel corpus, the parallel corpus including the second plurality of destination language sentences and their respective source language equivalents;

(d) applying, using a computer, the destination language parsing model to the second plurality of destination language sentences to generate a ranked list of candidate parse trees for each sentence of the second plurality of destination language sentences;

(e) transforming the candidate parse trees by applying, using a computer with a tree transformer, a rule set associated with linguistic characteristics of the source and destination languages;

(f) assigning, with a role labeler, a linguistic role label to nodes of the candidate parse trees, the role label corresponding to the linguistic role of a node within its respective parse tree;

(g) extracting grammar constraints from portions of each candidate parse tree;

(h) estimating the translingual parsing model using the extracted grammar constraints and source language sentences of the parallel corpus, the translingual parsing model including parameters sufficient to rank candidate parses, wherein the parameters relate elements of the candidate parses including source language words, destination language words, syntactic labels, and role labels.

21. The method of claim 20, wherein said linguistic characteristics include morphological structure of the source and destination languages.

22. The method of claim 20, wherein said linguistic characteristics include phrase structure of the source and destination languages.

23. The method of claim 20, wherein said estimating (h) is effected with a translingual grammar estimation module including a parser and a grammar.

24. The method of claim 20, wherein said receiving (c) comprises receiving a destination language corpus.

25. The method of claim 24, wherein said extracting (g) comprises extracting statistics relating to dependencies between elements from the parse trees of the destination language corpus.

26. The method of claim 25, wherein the dependencies comprise lexicalized dependencies.

27. A system for machine translation from a source language to a destination language, the system comprising:
   a translation module configured for receiving at least one sentence in the source language, producing destination language translations of the at least one sentence, including destination language words corresponding to words of the source language sentence, independently of any need for a source language treebank, and assigning syntactic labels indicating a syntactic category to the destination language words;
   a translingual parsing model configured for searching among and statistically ranking a plurality of candidate parses of the destination language words, each candidate parse having:
      elements labeled with destination language words corresponding to words of the source language sentence;
      syntactic labels indicating a syntactic category of the elements; and
      role labels indicating relationships between the elements;
   a parser configured for selecting the highest statistically ranked parse for the at least one sentence; and
   a reordering module configured for rearranging at least one of the statistically ranked parses, using the syntactic and role labels, in accordance with word order conventions of the destination language to generate a translingual parse of the source language sentence.

28. A system for generating a translingual parsing model for machine translating a source language to a destination language, said system comprising:
   a parser training module configured for receiving a destination language treebank having parse trees of a plurality of destination language sentences, the parse trees having nodes labeled with their syntactic categories;
   the parser training module configured for generating, using the destination language treebank, a destination language parsing model, including parameters for ranking candidate parse trees for a destination language sentence;
   the parser training module configured for receiving a second plurality of destination language sentences from a parallel corpus, the parallel corpus including the second plurality of destination language sentences and their respective source language equivalents;
   a destination language parser configured for applying the destination language parsing model to the second plurality of destination language sentences to generate a ranked list of candidate parse trees for each sentence of the second plurality of destination language sentences;
   a tree transformer configured for transforming the candidate parse trees by applying a rule set associated with linguistic characteristics of the source and destination languages;
   a role labeler configured to assign a linguistic role label to nodes of the candidate parse trees, the role label corresponding to the linguistic role of a node within its respective parse tree;
   an extraction module configured for extracting grammar constraints from portions of each candidate parse tree;
   a translingual grammar estimator configured for estimating the translingual parsing model using the extracted grammar constraints and source language sentences of the parallel corpus;
   the translingual parsing model including parameters sufficient to rank candidate parses, wherein the parameters relate elements of the candidate parses including source language words, destination language words, syntactic labels, and role labels.

29. The method of claim 28, wherein said linguistic characteristics include morphological structure of the source and destination languages.

30. The method of claim 28, wherein said linguistic characteristics include phrase structure of the source and destination languages.

31. An article of manufacture for machine translating a source language into a destination language, said article of manufacture comprising:
   a computer usable medium having a computer readable program code embodied therein, said computer usable medium having:
   computer readable program code for:
      receiving, at a translation module, at least one sentence in the source language;
      producing destination language translations of the at least one sentence, including destination language words corresponding to words of the source language sentence, independently of any need for a source language treebank;
      assigning syntactic labels indicating a syntactic category to the destination language words;
      searching among and statistically ranking, with a translingual parsing model, a plurality of candidate parses of the destination language words, each candidate parse having:
         elements labeled with destination language words corresponding to words of the source language sentence;
         syntactic labels indicating a syntactic category of the elements; and role labels indicating relationships between the elements;

selecting the highest statistically ranked parse for the at least one sentence; and rearranging the parse using the syntactic and role labels, in accordance with word order conventions of the destination language to generate a translingual parse of the source language sentence.

32. The article of manufacture of claim 31, comprising computer readable program code for generating the translingual parsing model.

33. The article of manufacture of claim 32, wherein said computer readable program code for generating the translingual parsing model comprises computer readable program code for:

receiving, at a parser training module, a destination language treebank having parse trees of a plurality of destination language sentences, the parse trees of said destination language sentences having nodes labeled with the syntactic labels;

generating, using the destination language treebank, a destination language parsing model, including parameters for ranking candidate parse trees for a destination language sentence;

receiving, at the parsing module, a second plurality of destination language sentences from a parallel corpus, the parallel corpus including the second plurality of destination language sentences and their respective source language equivalents;

applying the destination language parsing model to the second plurality of destination language sentences to generate a ranked list of candidate parse trees for each sentence of the second plurality of destination language sentences;

transforming the candidate parse trees by applying, with a tree transformer, a rule set associated with linguistic characteristics of the source and destination languages;

assigning, with a role labeler, a linguistic role label to nodes of the candidate parse trees, the role label corresponding to the linguistic role of a node within its respective parse tree;

extracting grammar constraints from portions of each candidate parse tree; and estimating the translingual parsing model using the extracted grammar constraints and source language sentences of the parallel corpus;

the translingual parsing model including parameters sufficient to rank candidate parses, wherein the parameters relate elements of the candidate parses including source language words, destination language words, syntactic labels, and role labels.

34. The method of claim 33, wherein said linguistic characteristics include morphological structure of the source and destination languages.

35. The method of claim 33, wherein said linguistic characteristics include phrase structure of the source and destination languages.

36. An automated translation machine for translating a source language into a destination language, said translation machine comprising:

means for receiving, at a translation module, at least one sentence in the source language;

means for producing destination language translations of the at least one sentence, including destination language words corresponding to words of the source language sentence, independently of any need for a source language treebank;

means for assigning syntactic labels indicating a syntactic category to the destination language words;

means for searching among and statistically ranking, with a translingual parsing model, a plurality of candidate parses of the destination language words, each candidate parse having:

elements labeled with destination language words corresponding to words of the source language sentence;

syntactic labels indicating a syntactic category of the elements; and role labels indicating relationships between the elements;

means for selecting the highest statistically ranked parse for the at least one sentence; and means for rearranging the parse using the syntactic and role labels, in accordance with word order conventions of the destination language to generate a translingual parse of the source language sentence.

37. The automated translation machine of claim 36, comprising means for generating the translingual parsing model.

38. The automated translation machine of claim 37, wherein said means for generating the translingual parsing model comprises:

means for receiving, at a parser training module, a destination language treebank having parse trees of a plurality of destination language sentences, the parse trees of said destination language sentences having nodes labeled with the syntactic labels;

means for generating, using the destination language treebank, a destination language parsing model, including parameters for ranking candidate parse trees for a destination language sentence;

means for receiving, at the parsing module, a second plurality of destination language sentences from a parallel corpus, the parallel corpus including the second plurality of destination language sentences and their respective source language equivalents;

means for applying the destination language parsing model to the second plurality of destination language sentences to generate a ranked list of candidate parse trees for each sentence of the second plurality of destination language sentences;

means for transforming the candidate parse trees by applying, with a tree transformer, a rule set associated with linguistic characteristics of the source and destination languages;

means for assigning, with a role labeler, a linguistic role label to nodes of the candidate parse trees, the role label corresponding to the linguistic role of a node within its respective parse tree;

means for extracting grammar constraints from portions of each candidate parse tree; and means for estimating the translingual parsing model using the extracted grammar constraints and source language sentences of the parallel corpus, the translingual parsing model including parameters sufficient to rank candidate parses, wherein the parameters relate elements of the candidate parses including source language words, destination language words, syntactic labels, and role labels.

39. The method of claim 38, wherein said linguistic characteristics include morphological structure of the source and destination languages.

40. The method of claim 38, wherein said linguistic characteristics include phrase structure of the source and destination languages.

* * * * *